US012732804B2

(12) United States Patent
Reddy et al.

(10) Patent No.: US 12,732,804 B2
(45) Date of Patent: Sep. 8, 2026

(54) SECURITY ENHANCEMENTS FOR ULTRA-WIDEBAND POSITIONING USING MANY-TO-MANY TRANSMISSIONS

(71) Applicant: QUALCOMM Incorporated, San Diego, CA (US)

(72) Inventors: Varun Amar Reddy, San Diego, CA (US); Alexandros Manolakos, Escondido, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 18/716,451

(22) PCT Filed: Oct. 10, 2022

(86) PCT No.: PCT/US2022/046199
§ 371 (c)(1),
(2) Date: Jun. 4, 2024

(87) PCT Pub. No.: WO2023/163753
PCT Pub. Date: Aug. 31, 2023

(65) Prior Publication Data

US 2025/0039665 A1 Jan. 30, 2025

(30) Foreign Application Priority Data

Feb. 28, 2022 (GR) .............................. 20220100179

(51) Int. Cl.
*H04W 12/037* (2021.01)
*G01S 13/76* (2006.01)
(Continued)

(52) U.S. Cl.
CPC ......... *H04W 12/037* (2021.01); *G01S 13/765* (2013.01); *H04L 9/0631* (2013.01); *H04W 12/121* (2021.01)

(58) Field of Classification Search
CPC ............. H04W 12/037; H04W 12/121; H04W 12/108; H04W 12/03; H04W 12/122;
(Continued)

(56) References Cited

U.S. PATENT DOCUMENTS

2007/0285306 A1* 12/2007 Julian .................. H04W 64/00
381/370
2010/0107250 A1* 4/2010 Li ....................... H04L 63/1466
726/22

(Continued)

FOREIGN PATENT DOCUMENTS

| EP | 3451599 A1 | 3/2019 |
|---|---|---|
| WO | 2021033927 A1 | 2/2021 |

OTHER PUBLICATIONS

Li et al., "Physical Layer Spoofing Attack Detection in MmWave Massive MIMO 5G Networks", Apr. 2021, IEEE Access, vol. 9, pp. 60419-60432 (Year: 2021).*

(Continued)

*Primary Examiner* — Kenneth W Chang
(74) *Attorney, Agent, or Firm* — Procopio, Cory, Hargreaves & Savitch LLP

(57) ABSTRACT

Aspects presented herein may enhance the security of UWB ranging, thereby improving the accuracy and reliability of the UWB ranging. In one aspect, a first wireless device embeds first information for generating a secure sequence of a ranging message in a payload section of the ranging message. The first wireless device generates the secure sequence based at least in part on the first information. The first wireless device transmits the ranging message including the secure sequence and the payload section for a second (Continued)

wireless device. In another aspect, a second wireless device receives a ranging message from a first wireless device that includes a first secure sequence and a payload section. The second wireless device generates a second secure sequence based on information embedded in the payload section of the ranging message.

25 Claims, 18 Drawing Sheets

(51) Int. Cl.
*H04L 9/06* (2006.01)
*H04W 12/121* (2021.01)

(58) Field of Classification Search
CPC .. H04W 12/104; G01S 13/765; G01S 1/0428; G01S 1/24; G01S 5/0205; H04L 9/0631
See application file for complete search history.

(56) References Cited

U.S. PATENT DOCUMENTS

| | | | | |
|---|---|---|---|---|
| 2018/0254923 | A1 | 9/2018 | Dutz et al. | |
| 2018/0254925 | A1* | 9/2018 | Dutz | H04B 1/7183 |
| 2019/0036739 | A1* | 1/2019 | Lindskog | H04L 25/0224 |
| 2019/0074930 | A1* | 3/2019 | Küchler | H04L 1/0041 |
| 2019/0132294 | A1* | 5/2019 | Li | H04W 12/06 |
| 2020/0003890 | A1* | 1/2020 | Yong | H04W 64/00 |
| 2020/0183000 | A1* | 6/2020 | Li | H04W 4/023 |
| 2021/0014677 | A1* | 1/2021 | Han | H04W 4/70 |
| 2021/0084492 | A1* | 3/2021 | Budhathoki | H04L 9/0869 |
| 2021/0173066 | A1* | 6/2021 | Yoon | H04L 9/0631 |
| 2021/0258795 | A1* | 8/2021 | Schober | H04W 12/63 |
| 2022/0123784 | A1* | 4/2022 | Lim | H04B 1/7183 |
| 2022/0174626 | A1 | 6/2022 | Yang et al. | |
| 2022/0385333 | A1* | 12/2022 | Yoon | G01S 13/76 |

OTHER PUBLICATIONS

IEEE SA: "IEEE Standard for Low-Rate Wireless Networks-Amendment 1: Enhanced Ultra Wideband (UWB) Physical Layers (PHYs) and Associated Ranging Techniques", IEEE Standard, 802.15.4z-2020, Piscataway, NJ, USA, Aug. 25, 2020, pp. 174, XP068170639, DOI: 10.1109/IEEESTD.2020.9179124 ISBN: 978-1-5044-6798-8, Section 7.4.2.20, 7.4.4.36, 7.4.4.42, 15.2.9.

International Search Report and Written Opinion—PCT/US2022/046199—ISA/EPO—Jan. 27, 2023.

* cited by examiner

200
One Frame (TDD)
10 ms
subframe
slot
RB
OFDM symbol
subcarrier
DMRS R
CSI-RS

230
PDCCH CORESET
SSS
PSS
PDSCH
PBCH
REG 12 REs
1 CCE = 6 REGs
SS/PBCH Block
BWP
20 RBs
channel bandwidth RBs 250
SRS
SRS Comb 0
SRS Comb 1

280
PUCCH
PUSCH

SECURITY ENHANCEMENTS FOR ULTRA-WIDEBAND POSITIONING USING MANY-TO-MANY TRANSMISSIONS

CROSS REFERENCE TO RELATED APPLICATIONS

This application is a National Stage Application filed under 35 U.S.C. § 371 of PCT International Application Serial No. PCT/US2022/046199 entitled "SECURITY ENHANCEMENTS FOR ULTRA-WIDEBAND POSITIONING USING MANY-TO-MANY TRANSMISSIONS" and filed on Oct. 10, 2022, which claims the benefit of Greek Application Serial No. 20220100179, entitled "SECURITY ENHANCEMENTS FOR ULTRA-WIDEBAND POSITIONING USING MANY-TO-MANY TRANSMISSIONS" and filed on Feb. 28, 2022, which are expressly incorporated by reference herein in their entirety.

TECHNICAL FIELD

The present disclosure relates generally to communication systems, and more particularly, to wireless communication involving positioning based on ultra-wideband (UWB).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus embeds first information for generating a secure sequence of a ranging message in a payload section of the ranging message. The apparatus generates the secure sequence based at least in part on the first information. The apparatus transmits the ranging message including the secure sequence and the payload section for a second wireless device.

In an aspect of the disclosure, a method, a computer-readable medium, and an apparatus are provided. The apparatus receives a ranging message from a first wireless device that includes a first secure sequence and a payload section. The apparatus generates a second secure sequence based on information embedded in the payload section of the ranging message.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
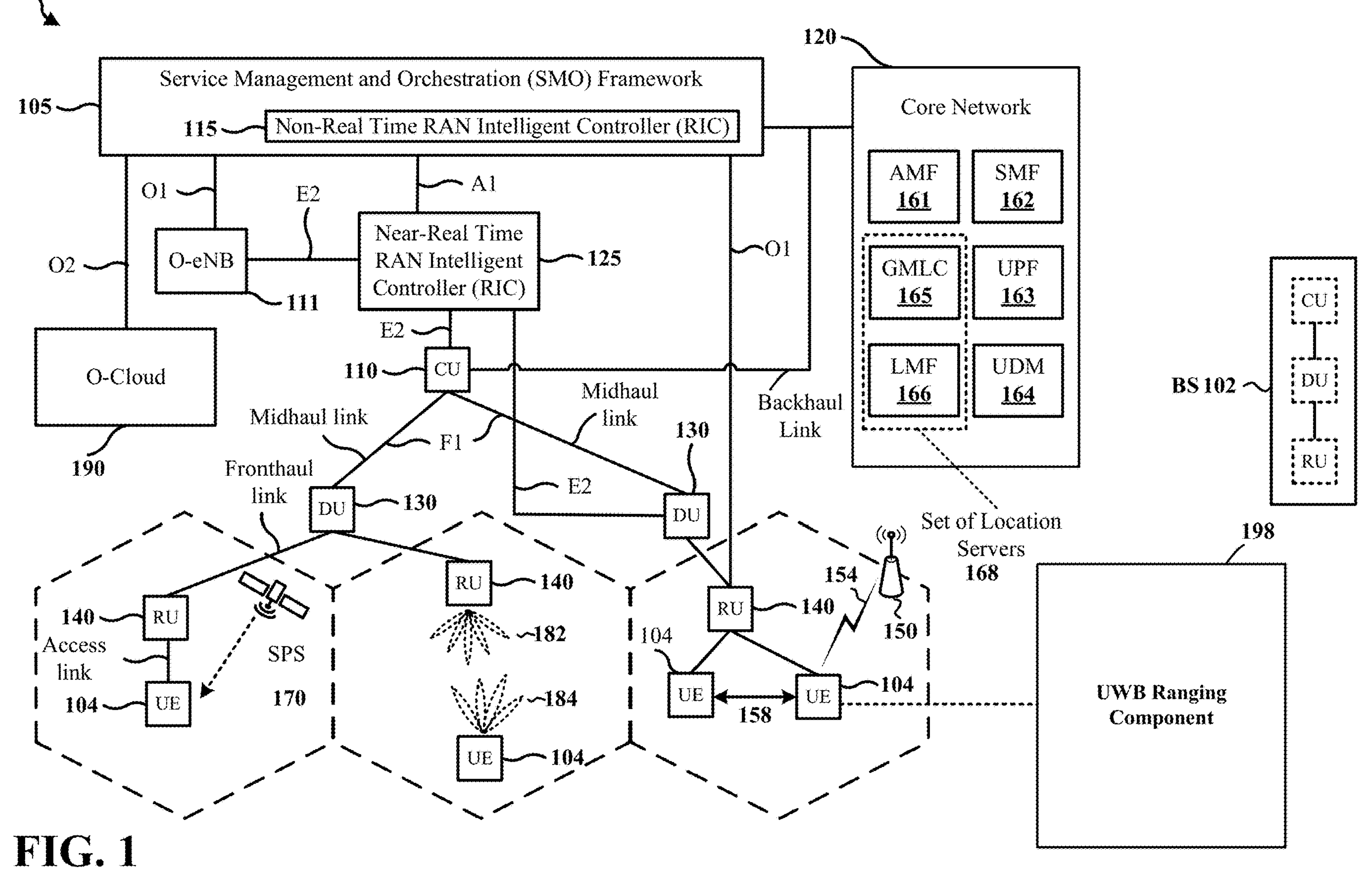
FIG. 1 is a diagram illustrating an example of a wireless communications system and an access network.

Aspects presented herein may enhance the security of UWB ranging, thereby improving the accuracy and reliability of the UWB ranging. Aspects presented herein may enable an authentic node/entity/device in a network or UWB ranging session (e.g., anchors and tags) to hide at least a portion of the STS generating/configuration parameters from the rest of the network. For example, in one aspect of the present disclosure, a transmitting device may be configured to embed unique information in its transmission which is used toward the generation of the STS.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FRI (410 MHZ-7.125 GHZ) and FR2 (24.25 GHz-52.6 GHZ). Although a portion of FR1 is greater than 6 GHz, FRI is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 (e.g., an anchor, a tag, etc.) may include a UWB ranging component 198 configured to establish or participate in a UWB ranging session. In one configuration, the UWB ranging component 198 may embed first information for generating a secure sequence of a ranging message in a payload section of the ranging message. In such configuration, the UWB ranging component 198 may generate the secure sequence based at least in part on the first information. In such configuration, the UWB ranging component 198 may transmit the ranging message including the secure sequence and the payload section for a second wireless device.

In another configuration, the UWB ranging component 198 may receive a ranging message from a first wireless device that includes a first secure sequence and a payload section. In such configuration, the UWB ranging component 198 may generate a second secure sequence based on information embedded in the payload section of the ranging message. In such configuration, the UWB ranging component 198 may verify the ranging message based on whether the first secure sequence correlates the second secure sequence.

Figures 2A, 2B, 2C, 2D:
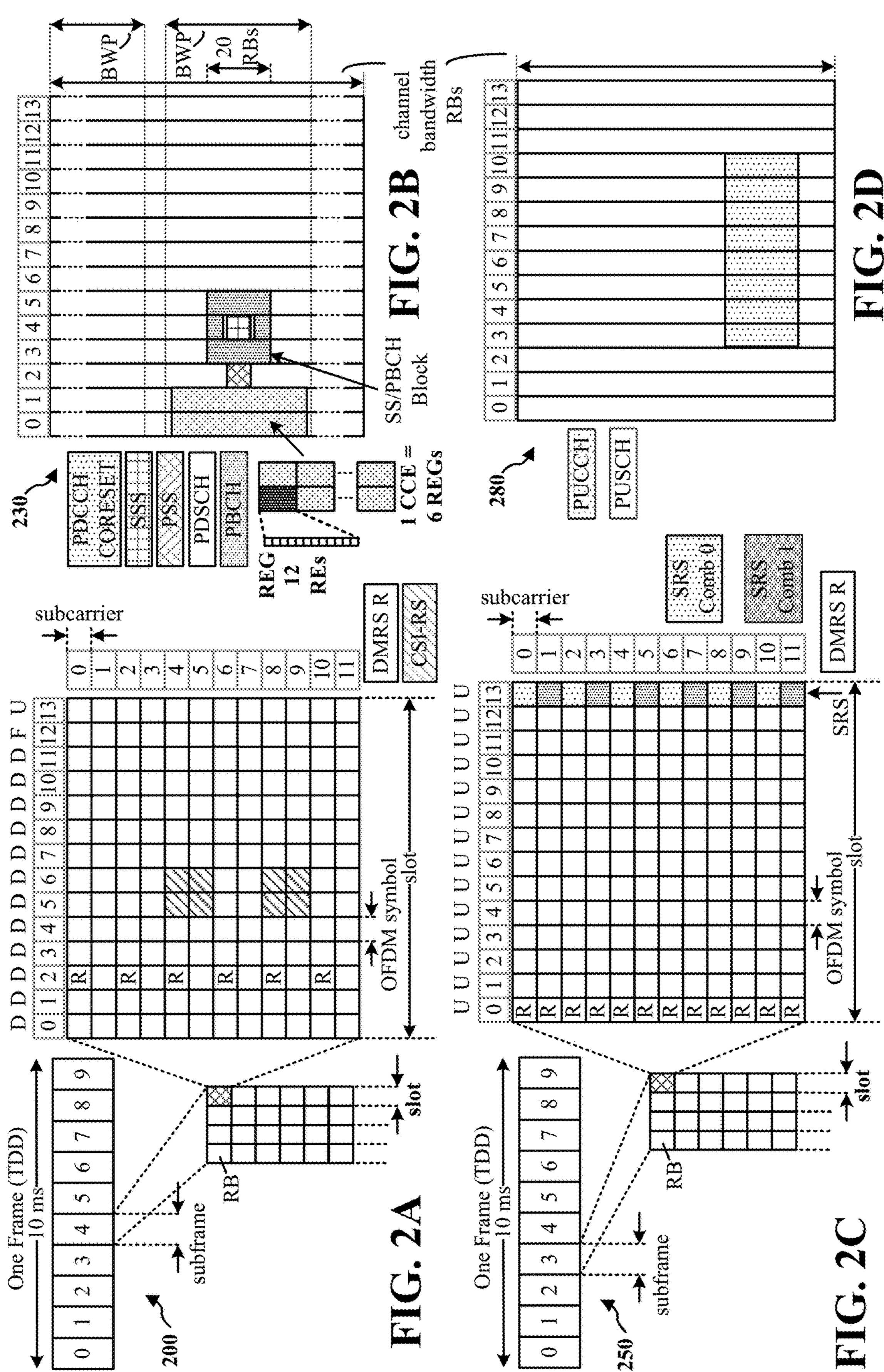
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 24 slots/subframe. The subcarrier spacing may be equal to $2^{\mu}*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
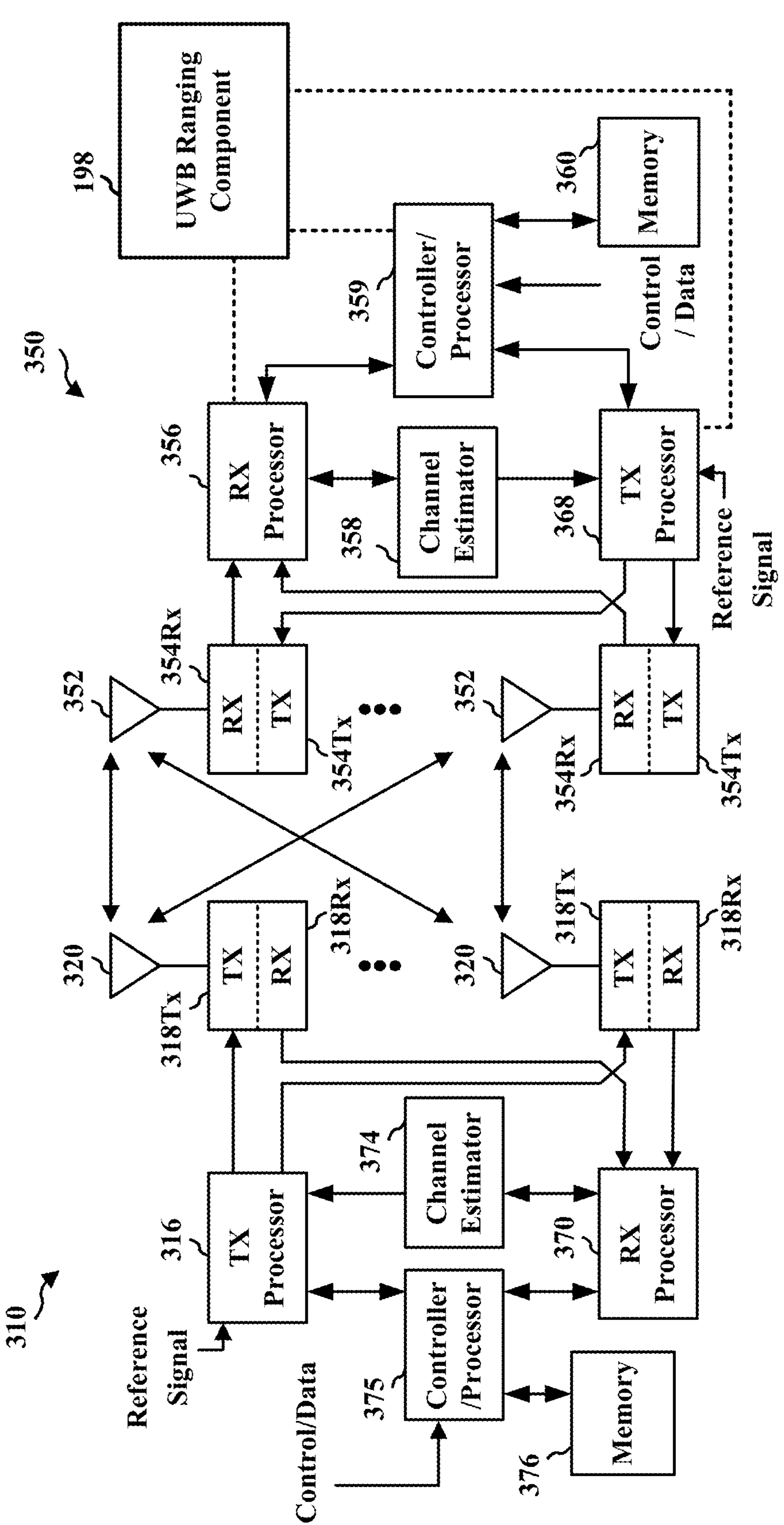
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization. The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the UWB ranging component 198 of FIG. 1.

A network may support a number of cellular network-based positioning technologies, such as downlink-based, uplink-based, and/or downlink-and-uplink-based positioning methods. Downlink-based positioning methods may include an observed time difference of arrival (OTDoA) (e.g., in LTE), a downlink time difference of arrival (DL-TDoA) (e.g., in NR), and/or a downlink angle-of-departure (DL-AoD) (e.g., in NR). In an OTDoA or DL-TDoA positioning procedure, a UE may measure the differences between each time of arrival (ToA) of reference signals (e.g., positioning reference signals (PRSs)) received from pairs of base stations, referred to as reference signal time difference (RSTD) measurements or time difference of arrival (TDoA) measurements, and report them to a positioning entity (e.g., a location server or a location management function (LMF)). For example, the UE may receive identifiers (IDs) of a reference base station (which may also be referred to as a reference cell or a reference gNB) and at least one non-reference base station in assistance data (AD). The UE may then measure the RSTD between the reference base station and each of the non-reference base stations. Based on the known locations of the involved base stations and the RSTD measurements, the positioning entity may estimate a location of the UE. In other words, a position of the UE may be estimated based on measuring reference signals transmitted between the UE and one or more base stations and/or transmission-reception points (TRPs) of the one or more base stations. As such, the PRSs may enable UEs to detect and measure neighbor TRPs, and to perform positioning based on the measurement. For purposes of the present disclosure, the suffixes "-based" and "-assisted" may refer respectively to the node that is responsible for making the positioning calculation (and which may also provide measurements) and a node that provides measurements (but which may not make the positioning calculation). For example, an operation in which measurements are provided by a UE to a base station/positioning entity to be used in the computation of a position estimate may be described as "UE-assisted," "UE-assisted positioning," and/or "UE-assisted position calculation" while an operation in which a UE computes its own position may be described as "UE-based," "UE-based positioning," and/or "UE-based position calculation."

In some examples, the term "TRP" may refer to one or more antennas of a base station whereas the term "base station" may refer to a complete unit (e.g., the base station 102/180). In other words, a TRP may be a set of geographically co-located antennas (e.g., antenna array (with one or more antenna elements)) supporting transmission point (TP) and/or reception point (RP) functionality. For example, a TRP may be similar to a transceiver of a UE. As such, a base station may transmit signal to and/or receive signal from other wireless device (e.g., a UE, another base station, etc.) via one or more TRPs. For purposes of the present disclosure, in some examples, the term "TRP" may be used interchangeably with the term "base station."

For DL-AoD positioning, the positioning entity may use a beam report from the UE of received signal strength measurements of multiple downlink transmit beams to determine the angle(s) between the UE and the transmitting base station(s). The positioning entity may then estimate the location of the UE based on the determined angle(s) and the known location(s) of the transmitting base station(s).

Uplink-based positioning methods may include UL-TDoA and UL-AoA. UL-TDoA may be similar to DL-TDoA, but may be based on uplink reference signals (e.g., sounding reference signals (SRSs)) transmitted by the UE. For UL-AoA positioning, one or more base stations may measure the received signal strength of one or more uplink reference signals (e.g., SRSs) received from a UE on one or more uplink receive beams. The positioning entity may use the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods may include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or a base station), which transmits an RTT response signal (e.g., an SRS or a PRS) back to the initiator. The RTT response signal may include the difference between the ToA of the RTT measurement signal and the transmission time of the RTT response signal, referred to as the reception-to-transmission (Rx-Tx) time difference. The initiator may calculate the difference between the transmission time of the RTT measurement signal and the ToA of the RTT response signal, referred to as the transmission-to-reception (Tx-Rx) time difference. The propagation time (also referred to as the "time of flight") between the initiator and the responder may be calculated from the Tx-Rx and Rx-Tx time differences. Based on the propagation time and the known speed of light, the distance between the initiator and the responder may be determined. For multi-RTT positioning, a UE may perform an RTT procedure with multiple base stations to enable its location to be determined (e.g., using multilateration) based on the known locations of the base stations. RTT and multi-RTT methods may be combined with other positioning techniques, such as UL-AoA and DL-AoD, to improve location accuracy.

Positioning based on measurement of ToA and/or TDoA may be referred to as ranged-based positioning, where the position of a wireless device may be determined based on measurements of distances between the wireless device and other wireless devices. For example, in range-based positioning, distances between wireless devices with a known location may be used for estimating the position of another wireless device without a known location based on a trilateration (or multilateration) process. In some examples, ranged-based positioning may be based on ultra-wideband (UWB) communications, where the UWB communications may include a radio signal with an instantaneous bandwidth of greater than 500 MHz or a fractional occupied bandwidth (Bf) greater than 0.2. For purposes of the present disclosure, a range-based positioning based on UWB may be referred to as UWB ranging, UWB positioning, a UWB ranging session, a UWB session, and/or a UWB ranging operation, etc.

Figures 4A, 4B:
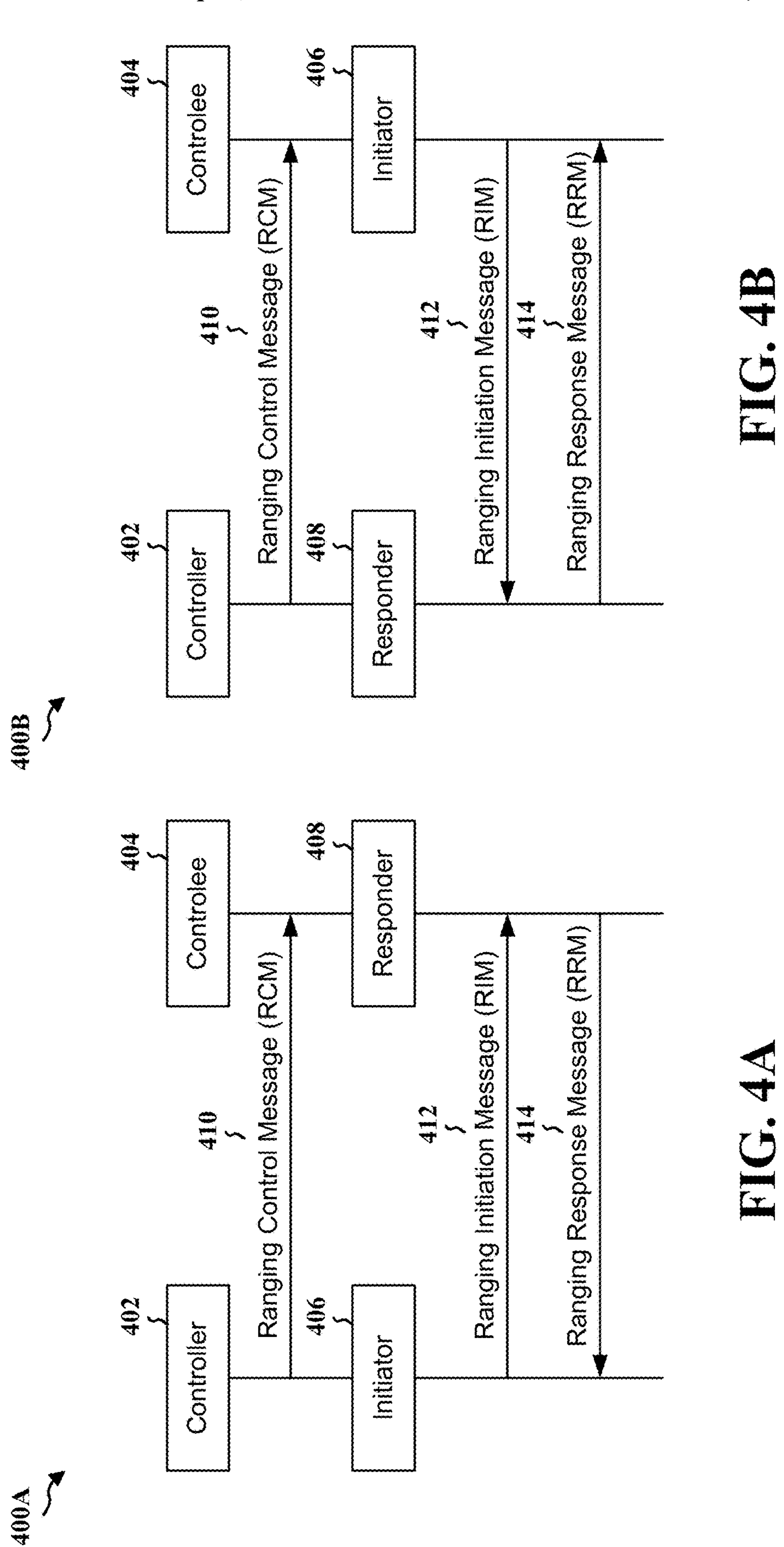
FIG. 4A is a diagram illustrating example roles for an ultra-wideband (UWB) ranging operation in accordance with various aspects of the present disclosure.
FIG. 4B is a diagram illustrating example roles for a UWB ranging operation in accordance with various aspects of the present disclosure.

FIGS. 4A and 4B are diagrams 400A and 400B, respectively, illustrating example roles (e.g., logical/network entities) in a UWB ranging operation in accordance with various aspects of the present disclosure. A UWB ranging operation may be performed by a set of enhanced ranging devices (ERDEVs) that is capable of communicating with each other via UWB (e.g., transmitting UWB signals or waveforms) and also via non-UWB (which may be referred to as out-of-band (OOB) communication, e.g., Bluetooth communication). In some examples, the ERDEVs may be base stations, components of a base stations, UEs, components of a UE, or a combination thereof.

Referring to the diagrams 400A and 400B, a UWB ranging operation may include multiple entities (or ERDEVs), such as a controller 402, a controlee 404, an initiator 406, and a responder 408. The controller 402 and the controlee 404 may be logical entities that are at a higher layer of a protocol stack, such as an application that is responsible for transmitting control messages (e.g., an application running on a device). On the other hand, the initiator 406 and the responder 408 may be operating at a physical (PHY) layer or a medium access control (MAC) layer, where signals may be exchanged between the initiator 406 and the responder 408 over the air based on UWB.

For example, as shown at 410, the controller 402 may be an ERDEV that controls a UWB ranging operation and defines the UWB ranging operation parameters for one or more controlees (e.g., the controlee 404) by sending a ranging control message (RCM) to the one or more controlees. The controlee 404 may be an ERDEV that utilizes the UWB ranging operation parameters received from the controller 402 in the RCM.

As shown at 412, the initiator 406 may be an ERDEV that follows the RCM and initiates a ranging message exchange by sending a first ranging message of the exchange (e.g., a ranging initiation message (RIM)) to one or more responders (e.g., the responder 408). A controller or a controlee can be an initiator. For example, as shown by the diagram 400A of FIG. 4A, the controller 402 may be the initiator 406, and as shown by the diagram 400B of FIG. 4B, the controlee 404 may be the initiator 406. For purposes of the present disclosure, a "ranging message" may refer to any types of messages that is transmitted during a ranging session, such as an UWB ranging session.

As shown at 414, the responder 408 may be an ERDEV that responds to the RIM received from the initiator 406. Similarly, a controller or a controlee can be an initiator.

In some examples, the transmission of the RCM at 410 may be based on OOB communications (e.g., non-UWB communications, such as based on Bluetooth communications), whereas the transmission of the ranging messages (e.g., the RIM and the RRM) at 412 and 414 may be transmitted based on UWB (e.g., which may also be referred to as "in-band" communications).

Figure 5:
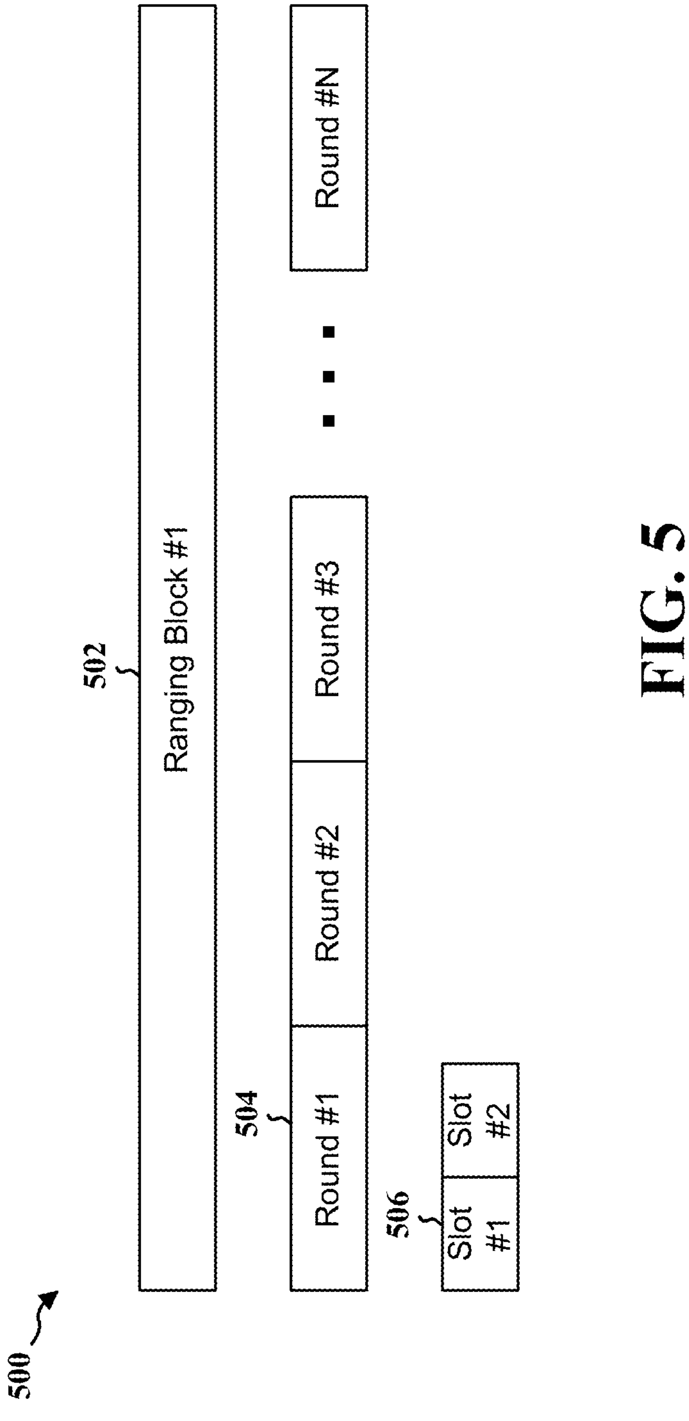
FIG. 5 is a diagram illustrating an example scheduling for UWB ranging in accordance with various aspects of the present disclosure.

FIG. 5 is a diagram 500 illustrating an example scheduling for UWB ranging in accordance with various aspects of the present disclosure. A UWB session between two devices, such as between an initiator and a responder, may include consecutive ranging blocks 502. Each ranging block 502 may include multiple ranging rounds 504, which in turn has several ranging slots 506. Within a ranging block 502, a responder may transmit just one message within a single round. A round index may either be statically configured by a controller or selected based on a hopping pattern. The slots 506 within a chosen round may be used sequentially to perform either single side-two way ranging (SS-TWR) or double side-two way ranging (DS-TWR). Multiple UWB sessions may be time-multiplexed to prevent interference with one and another.

Figure 6:
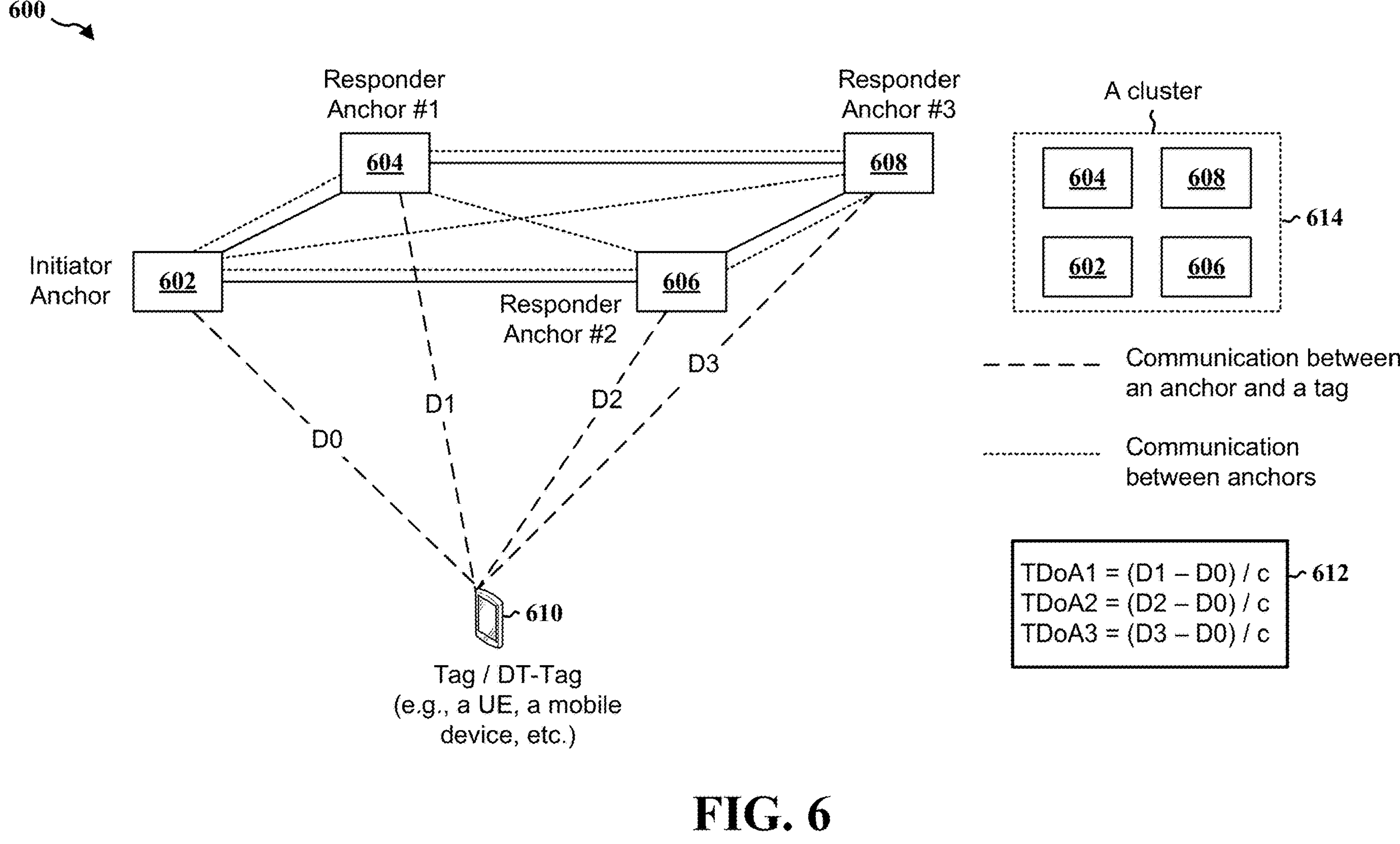
FIG. 6 is a diagram illustrating an example UWB ranging based on downlink time difference of arrival (DL-TDoA) in accordance with various aspects of the present disclosure.

FIG. 6 is a diagram 600 illustrating an example UWB ranging based on DL-TDoA in accordance with various aspects of the present disclosure. A transmitting device (e.g., a FiRa device) that transmits a downlink TDoA message (DTM) which can be used by one or more receiving devices to perform localization or positioning based on DL-TDoA may be referred to as an anchor, whereas a receiving device that receives DTMs from multiple anchors to perform localization or positioning based on DL-TDoA may be referred to as a tag or a downlink TDoA tag (DT-Tag). A UWB ranging operation may include one initiator anchor and multiple responder anchors, where a tag may listen and receive DTMs transmitted from the initiator anchor and the responder anchors to determine its location based on TDoA.

For example, referring to the diagram 600, a UWB ranging operation may include an initiator anchor 602, a first responder anchor 604, a second responder anchor 606, and a third responder anchor 608 (collectively as "DL-TDoA anchors") that are configured to transmit/broadcast DTMs. A tag 610 may receive DTMs transmitted by these DL-TDoA anchors, and precisely measure the reception times of every DTM that the tag 610 receives. Then, the tag 610 may utilize the reception timestamp along with obtained coordinates of DL-TDoA anchors to estimate its position. For example, as shown at 612, the tag 610 may calculate the TDoA for DTMs received between the initiator anchor 602 and other responder anchors 604, 606, and 608. Then, the tag 610 may estimate its position based on a trilateration (or multilateration) process. In some examples, the DTMs may also be used by anchors for performing synchronization between them. While DTMs may be exchanged between anchors, a tag may be configured to passively listen and receive DTMs (e.g., without transmitting messages to the anchors).

In one example, as shown at 614, a set of anchors that transmits DTMs or exchange DTMs with each other to provide a localization service to tags may be referred to as a cluster or a cluster of anchors. As such, a cluster may include one initiator anchor and one or more responder anchors. For example, the initiator anchor 602, the first responder anchor 604, the second responder anchor 606, and the third responder anchor 608 may be a cluster or part of a cluster.

To create or establish a cluster, an anchor (e.g., a Bluetooth advertiser) may broadcast configuration messages (e.g., OOB configuration messages, RCMs, etc.) associated with UWB ranging to other anchors within a coverage area. For example, the initiator anchor 602 may create a cluster by broadcasting configuration messages to the first responder anchor 604, the second responder anchor 606, and the third responder anchor 608 based on OOB communications (e.g., non-UWB communications, Bluetooth communications, etc.). After receiving the configuration messages, the first responder anchor 604, the second responder anchor 606, and the third responder anchor 608 may apply UWB ranging related parameters in the configuration messages and join the cluster created by the initiator anchor 602. Then, the cluster may provide UWB ranging for one or more tags, such as the tag 610.

Figure 7:
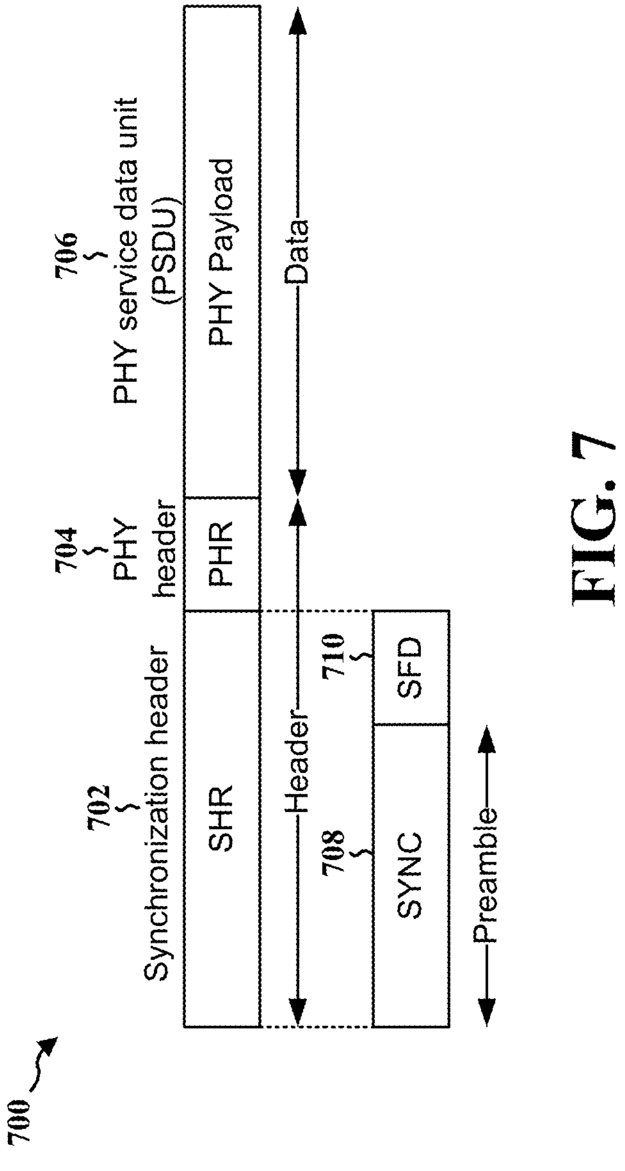
FIG. 7 is a diagram illustrating an example frame structure that may be used by a transmitting device for transmitting a ranging message during a UWB ranging operation in accordance with various aspects of the present disclosure.

FIG. 7 is a diagram 700 illustrating an example frame structure that may be used by a transmitting device for transmitting a ranging message during a UWB ranging operation in accordance with various aspects of the present disclosure. Wireless devices that are capable of communicating with each other based on UWB (hereafter "UWB devices"), such as anchors and tags, may use one of multiple predefined packet formats/configurations for transmitting or receiving a ranging message.

In one example, as shown by the diagram 700, a ranging message may include a synchronization header (SHR) 702, a physical layer (PHY) header (PHR) 704, and/or a PHY payload 706. The SHR 702 may further split into two parts: a synchronization (SYNC) field 708 and a start of frame delimiter (SFD) field 710 with variable lengths. The SYNC field 708 (which may also be referred to as a preamble) may include a predetermined sequence of pulses that may be used for the UWB ranging operation and/or for channel estimation. For example, a ranging functionality may be based on channel estimation using the SYNC field 708, which may be an Ipatov ternary sequence that exhibits good autocorrelation properties. The PHR 704 may include information about the data to be received, including the length of the data and the data rate used to transmit the data. The PHY payload 706 may include actual data, such as power switching service data unit (PSDU).

While using an Ipatov ternary sequence for the preamble (e.g., the SYNC field 808) of a ranging message may provide good autocorrelation properties, such preamble sequence may be susceptible to over-the-air attacks that can falsify ToA estimates at a receiver. As such, in some scenarios, to increase the integrity and accuracy of ranging measurements, a ranging message may further include a ciphered sequence, which may be denoted as a scrambled timestamp sequence (STS).

Figure 8:
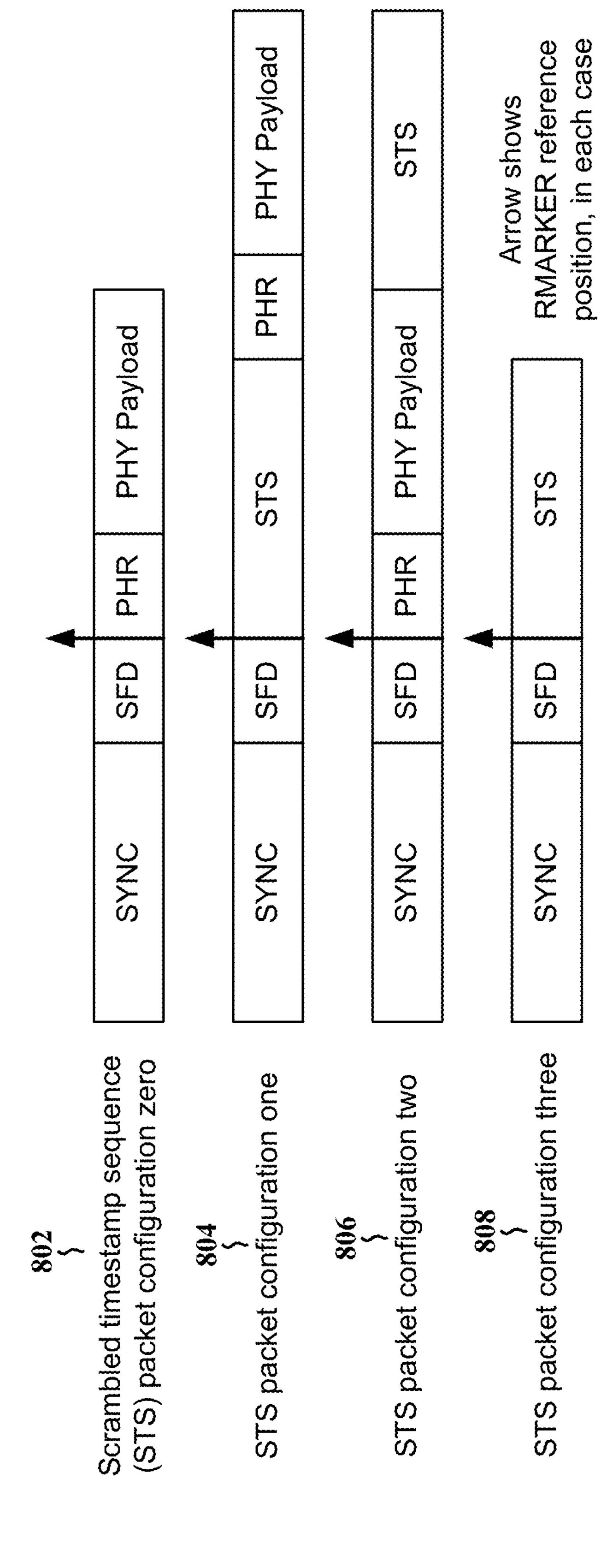
FIG. 8 is a diagram illustrating an example of scrambled timestamp sequence (STS) packet configurations that indicate the STS position in ranging message (e.g., an enhanced ranging device (ERDEV) frame structure) in accordance with various aspects of the present disclosure.

FIG. 8 is a diagram 800 illustrating an example of STS packet configurations that indicate the STS position in a ranging message (e.g., an ERDEV frame structure) in accordance with various aspects of the present disclosure. As shown at 802, for STS packet configuration zero, an STS may not present in a frame. As shown at 804, for STS packet configuration one, an STS is located after the synchronization header's SFD and before the PHR. As shown at 806, for STS packet configuration two, an STS is located after the PHR/Payload at the end of the frame. As shown at 808, for STS packet configuration three, an STS is located after the synchronization header's SFD, but the frame does not contain PHR/payload data. The SFD may serve to help demarcate the SYNC preamble from the STS.

In one example, an STS may be a secure sequence generated using a deterministic random bit generator (DRBG) based on Advanced Encryption Standard (AES) 128 bits (AES-128) in a counter mode, e.g., the STS may include sequences of pseudo-randomized pulses generated from AES-128. Both a transmitting device and one or more receiving devices may know the keys associated with generating/decoding the AES-128 (e.g., via an initial OOB configuration message, or an RCM, etc.) so that the one or more receiving devices may correctly receive the ranging messages. The STS may be secure against both accidental interference and intentional malicious attack.

In cryptography, a cipher may refer to an algorithm for performing encryption or decryption. AES is a specification for the encryption of data and is a subset of the Rijndael block cipher developed by two Belgian cryptographers who submitted a proposal to National Institute of Standards and Technology (NIST) during an AES selection process. Rijndael is a family of ciphers with different key and block sizes. For AES, NIST selected three members of the Rijndael family, each with a block size of 128 bits, but three different key lengths: 128, 192 and 256 bits. AES has been adopted and used worldwide. It may supersede the Data Encryption Standard (DES). The algorithm described by AES is a symmetric-key algorithm, meaning the same key is used for both encrypting and decrypting the data. AES is included in the ISO/IEC 18033-3 standard, and is available in many different encryption packages.

Figure 9:
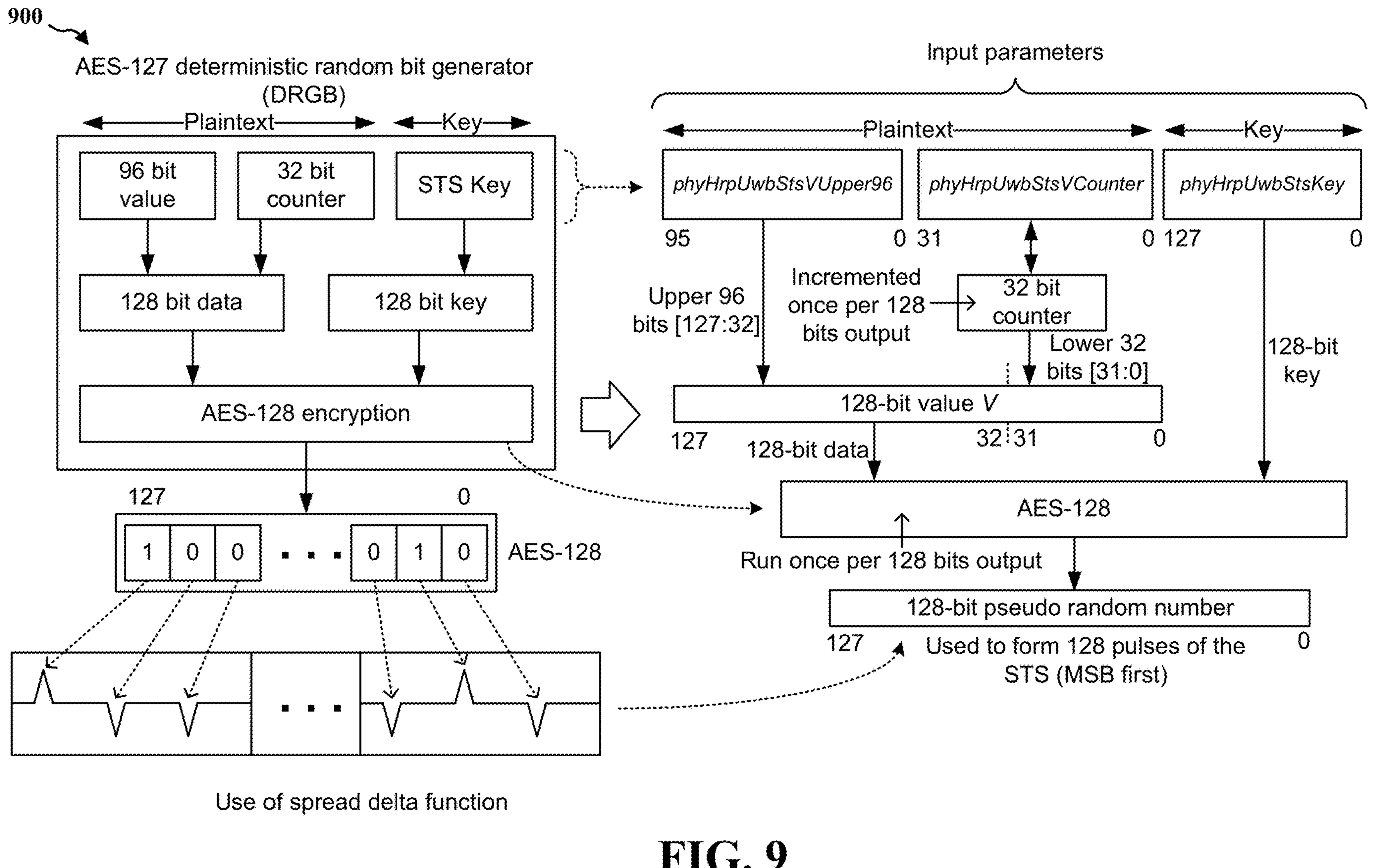
FIG. 9 is a diagram illustrating an example deterministic random bit generator (DRBG) for STS in accordance with various aspects of the present disclosure.

FIG. 9 is a diagram 900 illustrating an example DRBG for STS in accordance with various aspects of the present disclosure. In one example, the STS in a ranging message as shown by FIG. 8 may be generated using a DRBG. Each time the DRBG runs, the DRGB may produce a 128-bit pseudo-random number used to form pulses of the STS. The upper layer may be responsible for setting the 128-bit key, such as via a phyHrpUwbStsKey attribute, along with the 128-bit initial value for V, via phyHrpUwbStsVCounter and phyHrpUwbStsVUpper96 attributes. The 32-bit counter part of V may be incremented before each iteration of the DRBG to generate a new V value each time the DRBG runs to produce 128 bits/pulses for the STS. The receiver may use the same mechanism to align values of the key and V to generate a complementary sequence for cross correlation with the transmitted sequence. The mechanisms for agreeing, coordinating and synchronizing these values between a transmitting device and a receiving device (e.g., ERDEVs) may be performed via upper layers, as described in connection with FIGS. 4A and 4B.

In some scenarios, such as many-to-many scenarios (including many-to-one and/or one-to-many scenarios) for DL-TDoA and/or UL-TDoA, when multiple wireless devices and/or tags are either broadcast or multicast to an infrastructure or a cluster of anchors, there may be a significant security vulnerability.

Figure 10:
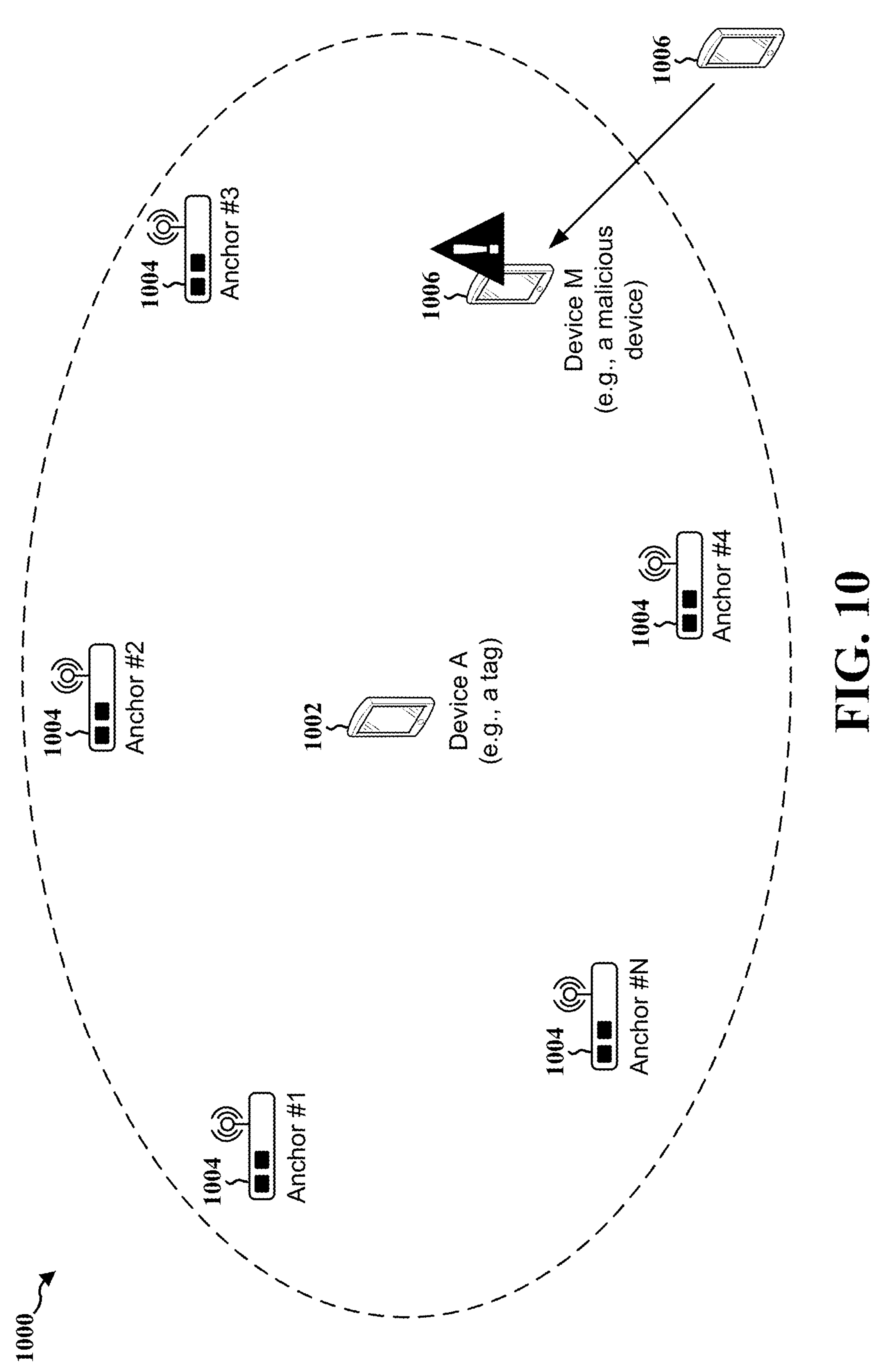
FIG. 10 is a diagram illustrating an example security vulnerability in a UWB ranging session in accordance with various aspects of the present disclosure.

FIG. 10 is a diagram 1000 illustrating an example security vulnerability in a UWB ranging session in accordance with various aspects of the present disclosure. A first device A 1002, such as a tag or a UE, may be sending UL-TDoA blink messages to a cluster of anchors 1004 for a UWB ranging session. Then, a second device M 1006 may join the network (or the UWB ranging session/cluster), where the second device M 1006 may be a malicious node/device that intends to hamper or spoof the position estimation performance in the network/UWB ranging session.

The anchors 1004 or an initiator anchor may broadcast configuration parameters associated with the UWB ranging from time to time, such as via out-of-band communications (e.g., Bluetooth communications). If an STS is to be included in ranging messages (e.g., STS pack configuration one, two, or three is used), the configuration parameters may include STS seed values, such as the plaintext and the key associated with AES-128 (as shown in FIG. 9) and/or the STS index, etc. The configuration parameters broadcasted by the anchors 1004 or an initiator anchor in the network may be received by all other devices (e.g., anchors, tags, UEs, etc.) in the network, which means that the device M 1006 (e.g., the malicious device) may also receive these configuration parameters, such as the plaintext, the key, and the STS index. As such, the device M 1006 may generate ranging messages based on these configuration parameters like the tag 1002 or the anchors 1004 to hamper or sabotage the UWB ranging session or the network. For example, by default, each slot for transmitting a UWB ranging message may be related to or associated with a unique STS index, which is incremented slot-by-slot from a seed value at the start of a UWB ranging session. However, as the device M 1006 may also receive all the configuration parameters associated with the UWB ranging session, the device M 1006 may generate over-the-air attacks.

Aspects presented herein may enhance the security of UWB ranging, thereby improving the accuracy and reliability of the UWB ranging. Aspects presented herein may enable an authentic node/entity/device in a network (e.g., the anchors 1004 and the device A 1002) to hide at least a portion of the STS generating/configuration parameters from the rest of the network. For example, in one aspect of the present disclosure, a transmitting device may be configured to embed unique information in its transmission which is used toward the generation of the STS (by both the transmitting device and a receiving device).

Figure 11:
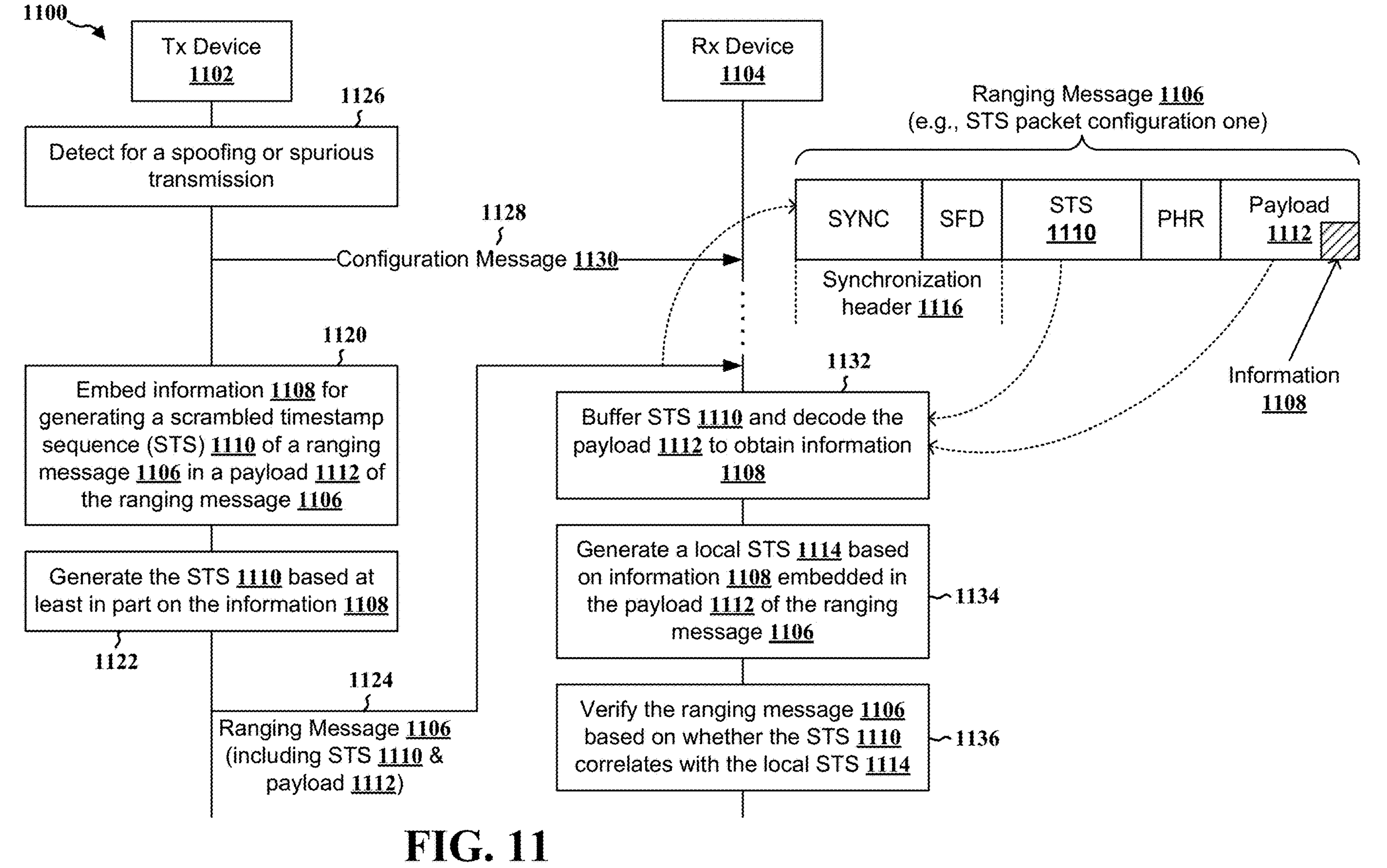
FIG. 11 is a communication flow illustrating an example of embedding information for generating an STS in a payload of a ranging message in accordance with various aspects of the present disclosure.

FIG. 11 is a communication flow 1100 illustrating an example of embedding information for generating an STS in a payload of a ranging message in accordance with various aspects of the present disclosure. The numberings associated with the communication flow 1100 do not specify a particular temporal order and are merely used as references for the communication flow 1100.

At 1120, a transmitting device 1102 may embed information 1108 (e.g., encoding information) that is associated with generating an STS 1110 of a ranging message 1106 in a payload section 1112 of the ranging message 1106. The transmitting device 1102 may be a wireless device that is capable of transmitting DL-TDoA messages (e.g., ranging response messages), such as an initiator anchor or a responder anchor, or the transmitting device 1102 may be a wireless device that is capable of transmitting UL-TDoA messages (e.g., blink messages), such as a tag or a UE. The ranging message 1106 may be associated with a UWB ranging session. As such, the ranging message may include a DL-TDoA response message or an UL TDoA blink message, etc.

In one aspect, the embedded information 1108 may correspond to a portion of input parameters (e.g., as shown by FIG. 9) that is used for generating the STS 1110. The input parameters may include the plaintext and/or the key associated with an encryption technique (e.g., the AES-128) and/or an STS index, etc. For example, the embedded information 1108 may correspond to a portion of the plaintext used in generating the STS 1110 (e.g., a portion of the data carried by the phyHrpUwbStsVUpper96 attribute or the phyHrpUwbStsVCounter attribute as shown by FIG. 9), or the embedded information 1108 may correspond to a portion of the key used in generating the STS 1110 (e.g., a portion of the data carried by the phyHrpUwbStsKey attribute as shown by FIG. 9), etc. In other words, the embedded information 1108 may be a portion of input/configuration parameters associated with an AES encryption.

In another aspect, the embedded information 1108 may identify a portion of the synchronization header 1116 that is used for generating the STS 1110. For example, the information 1108 may identify a portion of the SYNC field or the SFD field in the synchronization header 1116 of the ranging message 1106 that is used for generating the STS 1110.

As an illustration, prior to a UWB ranging session, the transmitting device 1102 (e.g., an initiation anchor) may broadcast configuration parameters to other devices (e.g., other anchors or tags) for establishing a UWB ranging session or forming a cluster, where the configuration parameters may include STS seed values (e.g., the plaintext, the key, and/or the STS index, etc.) that are associated with the STS used for ranging messages during the UWB ranging session. As the configuration parameters may be known to all devices that receive the configuration parameters, a malicious device that receives the configuration parameters may generate fake or harmful ranging messages based on the configuration parameters to tamper with the UWB ranging session.

To avoid such scenarios, the transmitting device 1102 may embed unique information (e.g., the information 1108) associated with generating the STS (e.g., the STS 1110) in the payload section of a ranging message. For example, the unique information may correspond to X bits (e.g., 10 bits, 20 bits, 96 bits, etc.) in the payload section that is used to replace X bits of the original plaintext (e.g., the original plaintext that is received by all device via configuration parameters) to create a new plaintext. Thus, a device that does not have this unique information (e.g., a device that is unaware of it or is unable to decode it from the payload) would generate the STS based on the original plaintext, whereas a device that has this unique information would generate the STS based on the new plaintext. Thus, a receiving device may be able to identify whether a ranging message is authentic based on whether the STS in the ranging message is generated using the new plaintext (discussed in more details below).

In another example, as an alternative, to reduce the transmission overhead (e.g., embedding X bits in the payload section 1112 for replacing the original plaintext), the information 1108 may point to a portion of the synchronization header 1116 (e.g., the SYNC field or the SFD field) of the ranging message 1106 that is to be used for generating the STS 1110. For example, the information 1108 may point to 10 bits in the SYNC field of the synchronization header 1116, which is to be combined with another 118 bits of the original plaintext to obtain an overall 128-bits new plaintext. Thus, a device that does not have information 1108 would generate the STS based on the original plaintext, whereas a device that has information 1108 would generate the STS based on the new plaintext. Thus, a receiving device may be able to identify whether a ranging message is authentic based whether the STS in the ranging message is generated based on the new plaintext. For example, after the transmitting device 1102 generates the STS 1110 based on the information 1108 (e.g., combine 10 bits in SYNC field with 118 bits from original plaintext), the transmitting device 1102 may point to a receiving device via the payload section 1112 which 10 bits in the SYNC field (e.g., bits #12 to 21) was used for generating the STS 1110. If the receiving device is able to decode the information 1108 from the payload section 1112, the receiving device may locally generate the same STS that was generated by the transmitting device 1102. By enabling the transmitting device to identify a portion of the synchronization header used for generating the STS, less bits may be used. For example, identifying a portion of bits in the SYNC field make take 3 to 4 bits, whereas including a portion of input parameters used for generating the STS 1110 in the payload section 1112 may take up to 128 bits depending on the implementation.

At 1122, after embedding the information 1108 in the payload section 1112, the transmitting device 1102 may generate the STS 1110 based on the information 1108. For example, the transmitting device 1102 may replace X bits of the original plaintext with X bits from the payload section when generating the STS 1110, or use N bits from the SYNC or SFD field and M bits from the original plaintext when generating the STS 1110, where N+M=128 if AES-128 is used.

At 1124, the transmitting device 1102 may transmit the ranging message 1106 to one or more receiving devices, which may include a receiving device 1104 (e.g., an authentic device), where the ranging message includes at least the STS 1110 and the payload section 1112. Similarly, the receiving device 1104 may be a wireless device that is capable of receiving DL-TDoA messages, such as a tag or a UE, or the receiving device 1104 may be a wireless device that is capable of receiving UL-TDoA messages, such as an initiator anchor or a responder anchor.

In some scenarios, to embed the information 1108 in a payload section of a ranging message, the transmitting device 1102 may be specified to use a ranging message format that includes a payload section. For example, referring back to FIG. 8, the transmitting device 1102 may be specified to use STS packet configuration one for the ranging message 1106 which includes an STS followed by a payload section. Thus, the transmitting device 1102 may not be able to use STS packet configuration three as it does not include a payload section.

In another aspect of the present disclosure, the transmitting device 1102 may initially be configured to operate at a default setting that does not specify embedding the information 1108 in a payload section of a ranging message and generating the STS 1110 based on the information 1108 (hereafter collectively referred to as "additional security feature"). Then, if the transmitting device 1102 (or another controlling device) detects a defined condition (e.g., a spoofing, spurious, or malicious transmission), the transmitting device 1102 may be triggered to apply this additional security feature as described in connection with 1120 and 1122.

For example, by default, the transmitting device 1102 may be configured to transmit ranging messages based on STS packet configuration three that does not include a payload section (e.g., as shown at 808 of FIG. 8) for UWB ranging. At 1126, if the transmitting device 1102 detects a spoofing transmission or a spurious transmission, the transmitting device 1102 may trigger the additional security feature described in connection with 1120 and 1122. As the STS packet configuration three does not include a payload section, the transmitting device 1102 may also be specified to switch to another STS packet configuration that includes a payload section, such as the STS packet configuration one (e.g., as shown at 804 of FIG. 8).

At 1128, the transmitting device 1102 may transmit a configuration message 1130 to the receiving device 1104, where the configuration message 1130 may include an indication informing the receiving device 1104 to switch to another STS packet configuration (e.g., to an STS configuration that includes a payload section, such as STS packet configuration one). In some examples, the configuration message 1130 may also include decoding information associated with how to find/decode the information 1108 embedded in the payload section 1112 of the ranging message 1106.

At 1132, after receiving the ranging message 1106 from the transmitting device 1102 that includes the STS 1110 and the payload section 1112, the receiving device 1104 may buffer the STS 1110 and decode the payload section 1112 to find the information 1108 (e.g., based on the decoding information received at 1128, initial configuration messages, and/or a random-bit generation strategy, which may be vendor-specific, proprietary, or standardized).

At 1134, after finding the information 1108, the receiving device 1104 may generate a local STS 1114 based on the information 1108 (e.g., generating an STS based on the new plaintext). For example, similar to the transmitting device 1102 at 1122, the receiving device may replace X bits of the original plaintext with X bits from the payload section when generating the local STS 1114, or use N bits from the SYNC or SFD field and M bits from the original plaintext when generating the STS 1114, etc.

At 1136, the receiving device 1104 may verify the authenticity of the ranging message 1106 by correlating the local STS 1114 with the STS 1110 received from the transmitting device 1102. For example, if a peak is detected in the cross-correlation between the local STS 1114 and the STS 1110, the receiving device 1104 may assume that a preamble has been detected and that the ranging message 1106 is valid/authentic. On the other hand, if a peak is not detected in the cross-correlation between the local STS 1114 and the STS 1110, it may indicate that the ranging message 1106 is not authentic (e.g., from a malicious device), is not directed to/intended for the receiving device 1104 (e.g., is for another device), or is an interference. For example, the receiving device 1104 may generate and cross-correlate the local STS 1114 's[n]' with the received STS 1110 'r[n]' based on:

$$R[k]=\Sigma_{n=-(N-1)}^{N-1}s[n]r[n-k],$$

where N may indicate the length of the STS sequence (e.g., the STS 1110). Then, the receiving device 1104 may calculate the time-of-arrival as a function of the delay at which there is a peak in the cross-correlation (which would happen if the received ranging message 1106 is a valid one).

In one example, aspects described in connection with FIG. 11 (e.g., including additional information for generating STS in the payload section) may be implemented by transmitting devices and receiving devices (e.g., both anchors and tags) at every slot as a malicious device or an adversary may attack any of the slots.

In another example, the techniques for generating the STS (e.g., how to create a new plaintext from the original plaintext) and/or how the unique information (e.g., the information 1108) may be decoded from the payload section of the ranging message may be provided to or configured for the transmitting devices and/or receiving devices via configuration information/message. For example, anchors or an infrastructure may provide a random-bit generation strategy to the tags, as part of the configuration message (e.g., which may either be out-of-band or in-band: within the RCM message during the control phase). The strategy may be vendor-specific, proprietary, and/or standardized to ensure integrity across products. In another example, the configuration information/message may also specify to the users how many unique bits/information is embedded, the mapping between these embedded bits and their position in the original 128-bit plaintext, whether the embedded bits point to a portion of the SYNC/SFD field, and/or the random-bit generation strategy, etc.

In some scenarios, it may be possible that a malicious device may discover how the unique information may be decoded from the payload section of a ranging message and generates the STS based on the unique information. However, as the ranging message may have already been received by a receiving device and buffered by the ranging device, it may be too late for the malicious device to generate an attack even if the malicious device is able to generate the same STS. For example, by default, all devices including the malicious device may be able to generate STS sequence based on the unique information.

In another aspect of the present disclosure, if a receiving device (e.g., the receiving device 1104) is unable to buffer the ranging message or an STS block (e.g., the STS 1110), such as due to lack of memories or lower capabilities, other STS packet configuration formats may be configured for the transmitting device and the receiving device. For example, to fully buffer an STS block of 64 microseconds (μs) duration at a sampling rate of 998.4 MHz at a receiving device may specify a memory of approximately 118,272 bytes (e.g., if I/Q is 7-bits each) or 202,752 bytes (e.g., I/Q is 12-bits each). Hence, buffering specification may be higher at the receiving device. I/Q or I/Q data may refer to a method of describing the magnitude and phase data of a signal. In the event of buffering constraints at the receiving device (e.g., the receiving device is unable to fully buffer the STS or the ranging message), one or more packet formats may be defined for the STS packet configuration.

In one example, referring back to FIG. 11, at 1132, the receiving device 1104 may be configured to buffer just a portion of the STS 1110. Then, at 1134, the receiving device may generate the local STS 1114 after decoding information 1108 embedded in the payload section 1112. While this can be used as an integrity check and to detect spoofing, the channel estimate quality may be lowered/reduced since a smaller portion of the STS 1110 is being used.

Figures 18A, 18B:
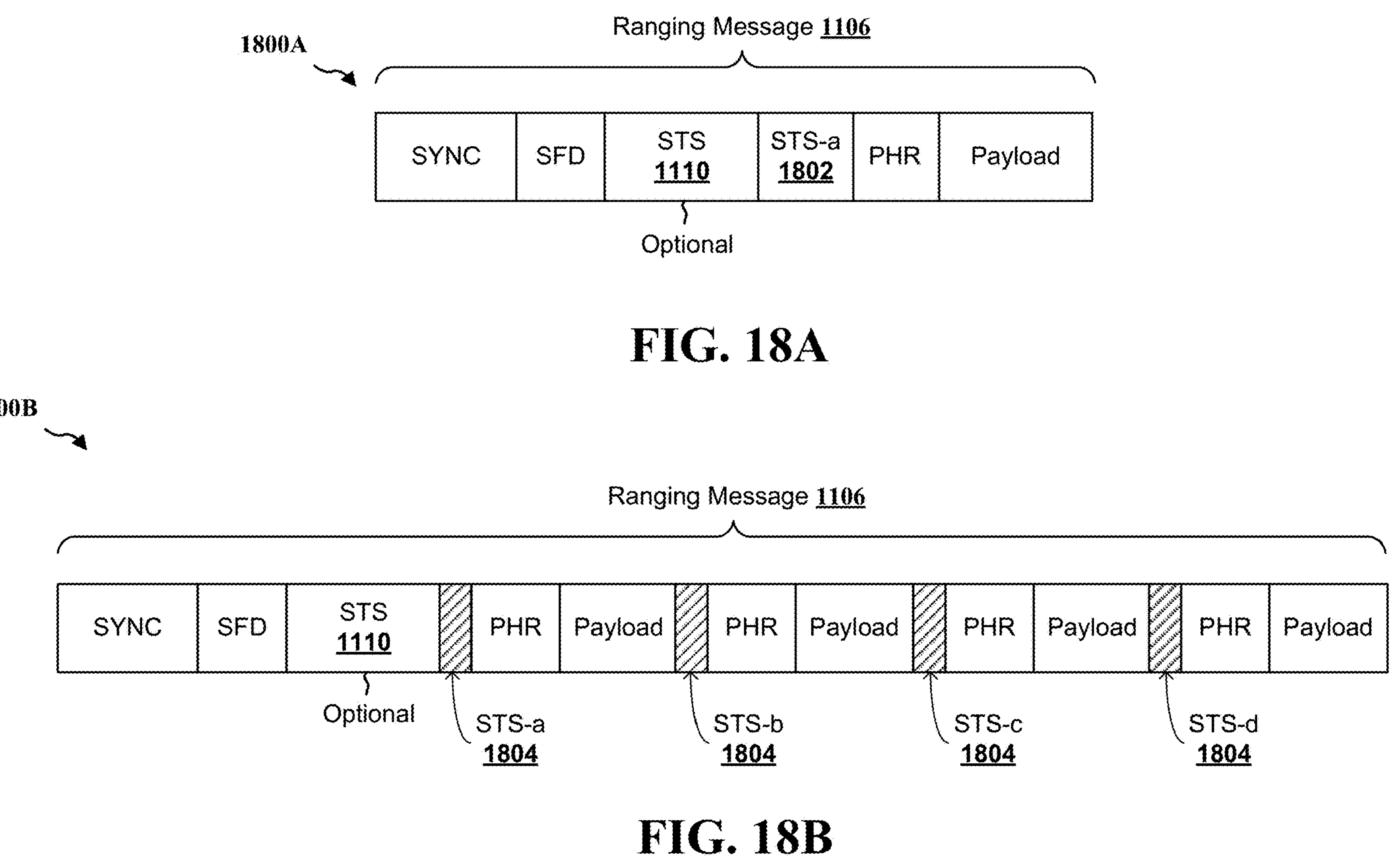
FIG. 18A is a diagram illustrating an example ranging message with a reduced size STS segment in accordance with various aspects of the present disclosure.
FIG. 18B is a diagram illustrating an example ranging message with multiple small STS repetitions in accordance with various aspects of the present disclosure.

In another example, as shown by a diagram 1800A of FIG. 18A, the ranging message 1106 may include an additional smaller STS segment, such as an STS-a 1802, followed by the payload. As such, the transmitting device 1102 may either transmit both the STS 1110 and the STS-a 1802 if the receiving device 1104 has the capability to buffer them, or transmit the STS-a 1802 but not the STS 1110 to reduce buffer constraints at the receiving device 1104 (e.g., if the receiving device 1104 does not have the capability to buffer the full STS 1110). If the transmitting device 1102 configures the STS-a 1802 for the receiving device 1104 (e.g., with or without STS 1110), the transmitting device 1102 may also be configured to assumed that the receiving device 1104 meets the buffering specification. Similarly, while this can be used as an integrity check and to detect spoofing, the channel estimate quality may be lowered/reduced since a smaller STS is being used (if just the STS-a 1802 is used).

In another example, as shown by a diagram 1800B of FIG. 18B, the ranging message 1106 may include multiple STS repetitions 1804, but in smaller sizes compared to the STS 1110, such that each of the STS repetitions 1804 may be buffered at the receiving device 1104 and used by the receiving device 1104 for channel estimation and integrity check. As such, the transmitting device 1102 may either transmit both the STS 1110 and the multiple STS repetitions 1804 if the receiving device 1104 has the capability to buffer them, or transmit the multiple STS repetitions 1804 but not the STS 1110 to reduce buffer constraints at the receiving device 1104 (e.g., if the receiving device 1104 does not have the capability to buffer the full STS 1110). By combining the channel estimates obtained using each of the STS repetitions 1804, the channel estimate quality and performance may also be improved.

Figure 12:
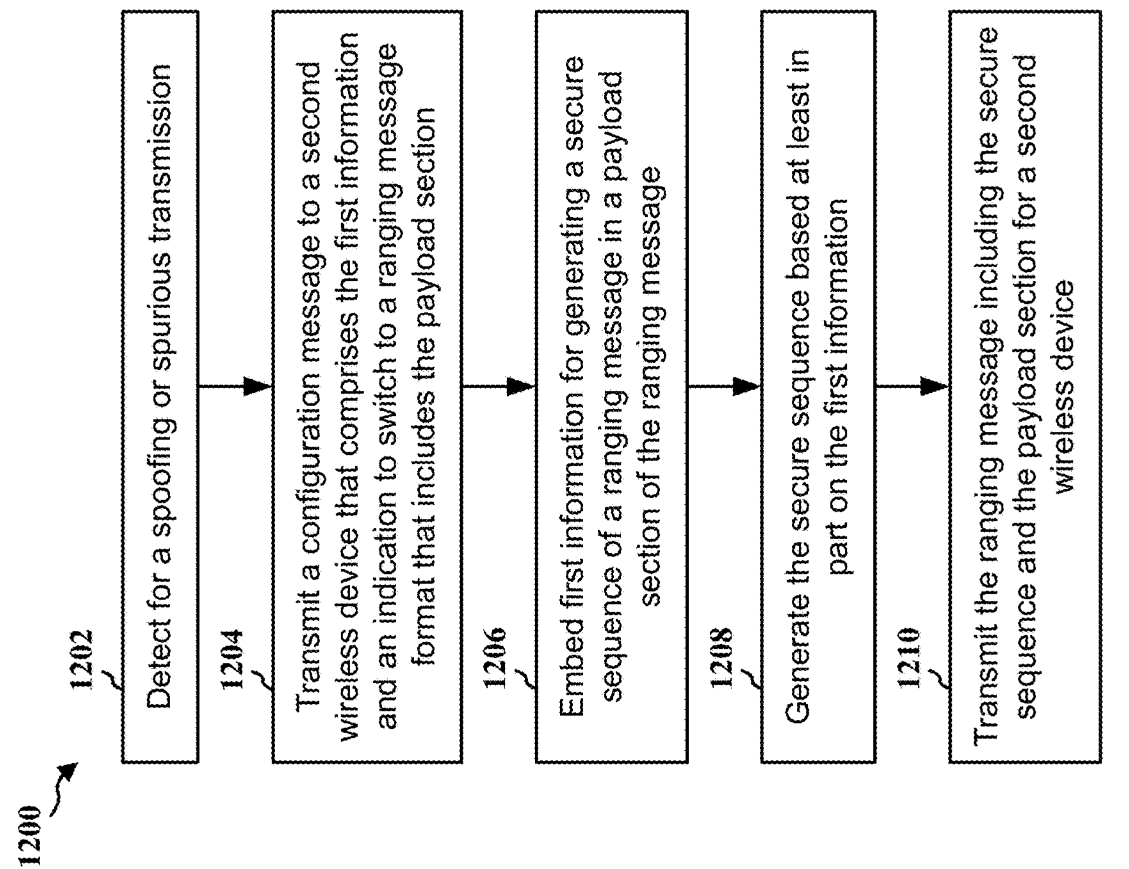
FIG. 12 is a flowchart of a method of wireless communication.

FIG. 12 is a flowchart 1200 of a method of wireless communication. The method may be performed by a first wireless device (e.g., the UE 104; the base station 102; the device A 1002; the anchors 1004; the transmitting device 1102; the apparatus 1404; the network entity 1402). The method may enable the first wireless device to hide a portion of parameters associated with generating a secure sequence, such as an STS, from the rest of a network.

At 1202, the first wireless device may detect for a spoofing transmission or a spurious transmission, where a secure sequence may be generated for a ranging message based at least in part on information when the spoofing transmission or the spurious transmission is detected, such as described in connection with FIG. 11. For example, at 1126, the transmitting device 1102 may detect for a spoofing transmission or a spurious transmission, where the STS 1110 may be generated for the ranging message 1106 based on the information 1108 when the spoofing transmission or the spurious transmission is detected. The detection of the spoofing transmission or the spurious transmission may be performed by, e.g., the UWB ranging component 198 of the apparatus 1404 in FIG. 14.

At 1204, the first wireless device may transmit a configuration message for the second wireless device that includes the first information and an indication to switch to a ranging message format that includes the payload section, such as described in connection with FIG. 11. For example, at 1128, the transmitting device 1102 may transmit a configuration message 1130 to the receiving device 1104 that includes the information 1108 and an indication to switch to a ranging message format that includes the payload section 1112. The transmission of the configuration message may be performed by, e.g., the UWB ranging component 198 and/or the cellular RF transceiver 1422 of the apparatus 1404 in FIG. 14.

At 1206, the first wireless device may embed first information for generating a secure sequence of a ranging message in a payload section of the ranging message, such as described in connection with FIG. 11. For example, at 1120, the transmitting device 1102 may embed the information 1108 for generating the STS 1110 of the ranging message 1106 in the payload section 1112 of the ranging message 1106. The embedding of the first information may be performed by, e.g., the UWB ranging component 198 of the apparatus 1404 in FIG. 14.

In one example, the first information may correspond to a portion of an input parameter for generating the secure sequence. In such an example, the input parameter may include a plaintext or a key associated with an AES encryption.

In another example, the first information may identify a portion of an SYNC field of the ranging message.

In another example, the first information may identify a portion of an SFD field of the ranging message.

In another example, the first wireless device and the second wireless device may include an anchor device, a tag device, or both.

In another example, the ranging message may be associated with a first STS packet configuration or an STS packet configuration one.

In another example, the ranging message may be associated with an UWB ranging session.

In another example, the ranging message may be a DL message (e.g., a DL-TDoA response message) or an UL message (e.g., an UL TDoA blink message).

At 1208, the first wireless device may generate the secure sequence based at least in part on the first information, such as described in connection with FIG. 11. For example, at 1122, the transmitting device 1102 may generate the STS 1110 based at least in part on the information 1108. The generation of the secure sequence may be performed by, e.g., the UWB ranging component 198 of the apparatus 1404 in FIG. 14.

At 1210, the first wireless device may transmit the ranging message including the secure sequence and the payload section for a second wireless device, such as described in connection with FIG. 11. For example, at 1124, the transmitting device 1102 may transmit the ranging message 1106 including the STS 1110 and the payload section 1112 to the receiving device 1104. The transmission of the ranging message may be performed by, e.g., the UWB ranging component 198 and/or the cellular RF transceiver 1422 of the apparatus 1404 in FIG. 14.

In one example, a portion of the secure sequence, a reduced size secure subsequence, or smaller repetitions of the secure sequence is transmitted in the ranging message (whether to transmit the portion of the secure sequence, the reduced size secure subsequence, or smaller repetitions of the secure sequence with the secure sequence or in place of the secure sequence may be based on a buffering capability associated with the second wireless device, such as described in connection with FIGS. 18A and 18B).

Figure 13:
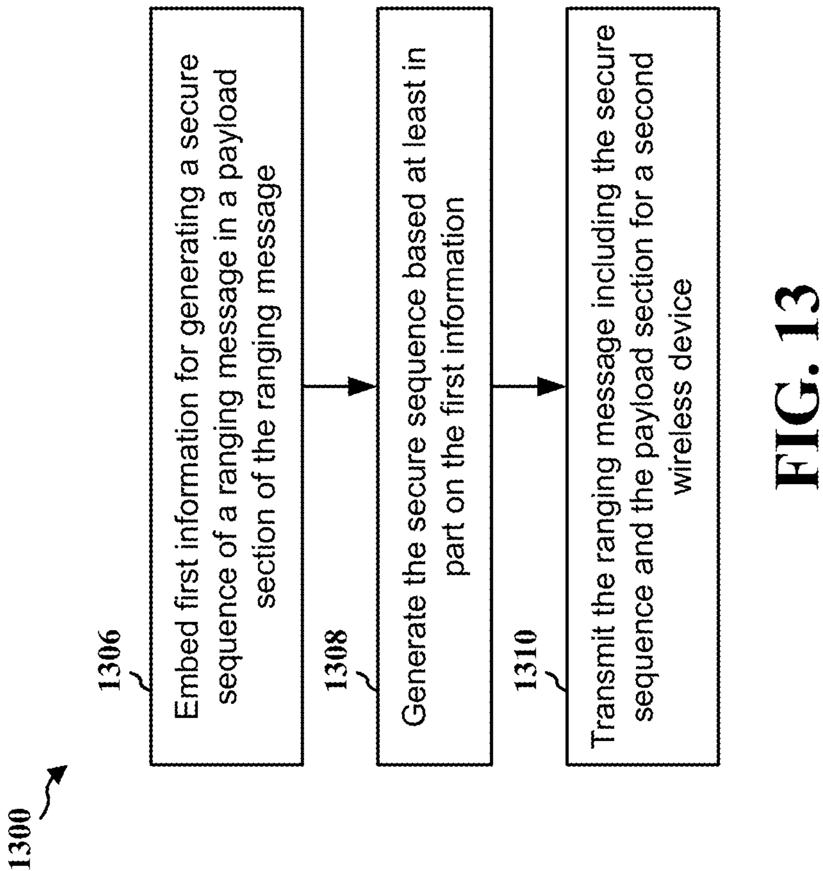
FIG. 13 is a flowchart of a method of wireless communication.

FIG. 13 is a flowchart 1300 of a method of wireless communication. The method may be performed by a first wireless device (e.g., the UE 104; the base station 102; the device A 1002; the anchors 1004; the transmitting device 1102; the apparatus 1404; the network entity 1402). The method may enable the first wireless device to hide a portion of parameters associated with generating a secure sequence from the rest of a network.

At 1306, the first wireless device may embed first information for generating a secure sequence of a ranging message in a payload section of the ranging message, such as described in connection with FIG. 11. For example, at 1120, the transmitting device 1102 may embed the information 1108 for generating the STS 1110 of the ranging message 1106 in the payload section 1112 of the ranging message 1106. The embedding of the first information may be performed by, e.g., the UWB ranging component 198 of the apparatus 1404 in FIG. 14.

In one example, the first information may correspond to a portion of an input parameter for generating the secure sequence. In such an example, the input parameter may include a plaintext or a key associated with an AES encryption.

In another example, the first information may identify a portion of an SYNC field of the ranging message.

In another example, the first information may identify a portion of an SFD field of the ranging message.

In another example, the first wireless device and the second wireless device may include an anchor device, a tag device, or both.

In another example, the ranging message may be associated with a first STS packet configuration or an STS packet configuration one.

In another example, the ranging message may be associated with an UWB ranging session.

In another example, the ranging message may be a DL message or an UL message.

At 1308, the first wireless device may generate the secure sequence based at least in part on the first information, such as described in connection with FIG. 11. For example, at 1122, the transmitting device 1102 may generate the STS 1110 based at least in part on the information 1108. The generation of the secure sequence may be performed by, e.g., the UWB ranging component 198 of the apparatus 1404 in FIG. 14.

At 1310, the first wireless device may transmit the ranging message including the secure sequence and the payload section for a second wireless device, such as described in connection with FIG. 11. For example, at 1124, the transmitting device 1102 may transmit the ranging message 1106 including the STS 1110 and the payload section 1112 to the receiving device 1104. The transmission of the ranging message may be performed by, e.g., the UWB ranging component 198 and/or the cellular RF transceiver 1422 of the apparatus 1404 in FIG. 14.

In one example, a portion of the secure sequence, a reduced size secure subsequence, or smaller repetitions of the secure sequence is transmitted in the ranging message (whether to transmit the portion of the secure sequence, the reduced size secure subsequence, or smaller repetitions of the secure sequence with the secure sequence or in place of the secure sequence may be based on a buffering capability associated with the second wireless device, such as described in connection with FIGS. 18A and 18B).

In another example, the first wireless device may detect for a spoofing transmission or a spurious transmission, where the secure sequence is generated based at least in part on the first information when the spoofing transmission or the spurious transmission is detected, such as described in connection with FIG. 11. For example, at 1126, the transmitting device 1102 may detect for a spoofing transmission or a spurious transmission, where the STS 1110 may be generated for the ranging message 1106 based on the information 1108 when the spoofing transmission or the spurious transmission is detected. The detection of the spoofing transmission or the spurious transmission may be performed by, e.g., the UWB ranging component 198 of the apparatus 1404 in FIG. 14.

In another example, the transmitting device may transmit a configuration message for the second wireless device that includes the first information and an indication to switch to a ranging message format that includes the payload section, such as described in connection with FIG. 11. For example, at 1128, the transmitting device 1102 may transmit a configuration message 1130 to the receiving device 1104 that includes the information 1108 and an indication to switch to a ranging message format that includes the payload section 1112. The transmission of the configuration message may be performed by, e.g., the UWB ranging component 198 and/or the cellular RF transceiver 1422 of the apparatus 1404 in FIG. 14.

Figure 14:
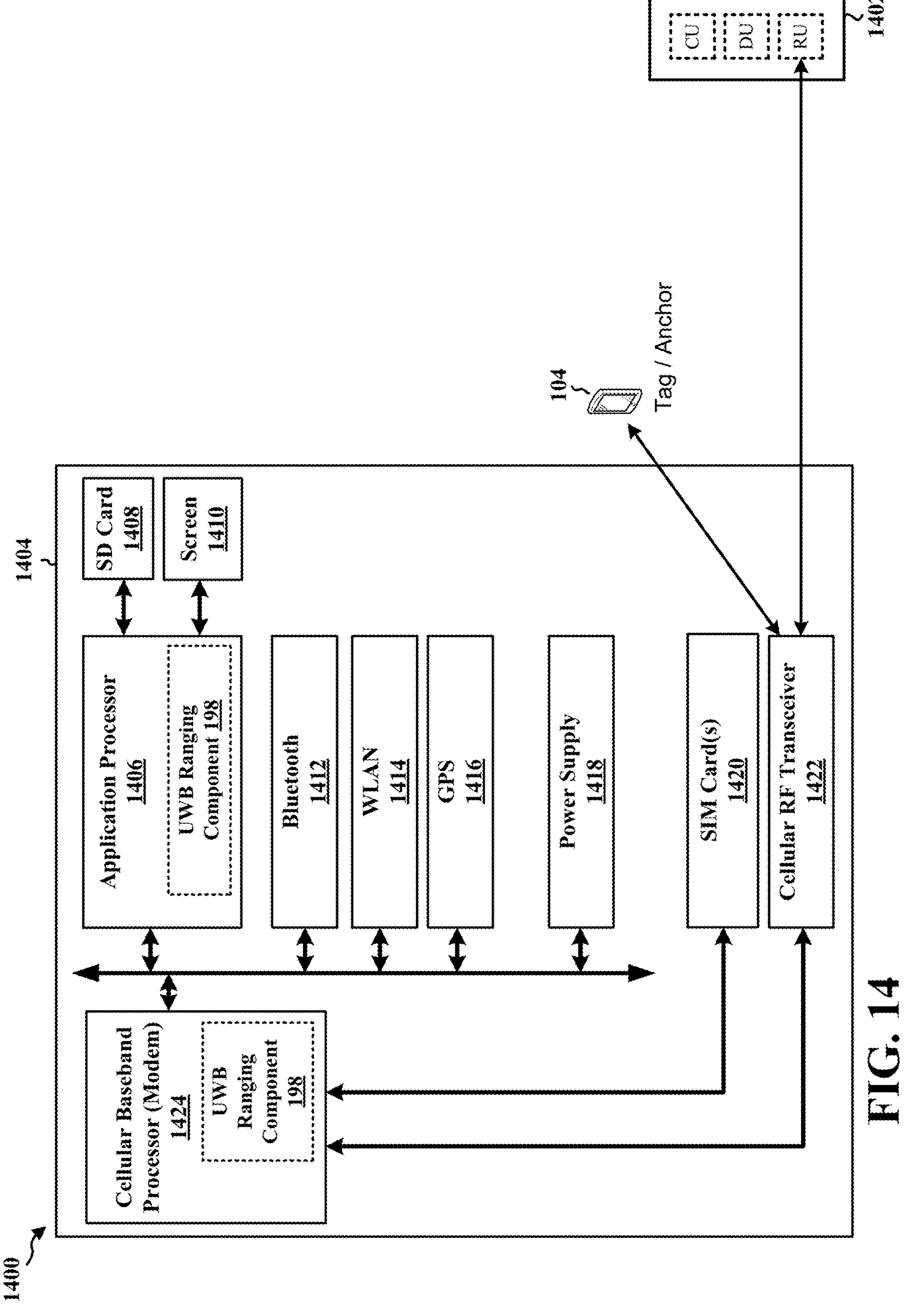
FIG. 14 is a diagram illustrating an example of a hardware implementation for an example apparatus and/or network entity.

FIG. 14 is a diagram 1400 illustrating an example of a hardware implementation for an apparatus 1404 and a network entity 1402. The apparatus 1404 may be transmitting device (e.g., a UE/BS, a component of a UE/BS, or may implement UE/BS functionality). The network entity 1402 may be a BS, a component of a BS, or may implement BS functionality. In some aspects, the apparatus 1404 may include a cellular baseband processor 1424 (also referred to as a modem) coupled to a cellular RF transceiver 1422. In some aspects, the apparatus 1404 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The cellular baseband processor 1424 communicates through the cellular RF transceiver 1422 with the UE 104 (e.g., a tag, an anchor, etc.) and/or with an RU associated with the network entity 1402. The RU is either part of the network entity 1402 or is in communication with the network entity 1402. The network entity 1402 may include one or more of the CU, DU, and the RU. The cellular baseband processor 1424 and the application processor 1406 may each include a computer-readable medium/memory. Each computer-readable medium/memory may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the UWB ranging component 198 is configured to embed first information for generating a secure sequence of a ranging message in a payload section of the ranging message. The UWB ranging component 198 may also be configured to generate the secure sequence based at least in part on the first information. The UWB ranging component 198 may also be configured to transmit the ranging message including the secure sequence and the payload section for a second wireless device. The UWB ranging component 198 may be within the cellular baseband processor 1424, the application processor 1406, or both the cellular baseband processor 1424 and the application processor 1406. The UWB ranging component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for embedding first information for generating a secure sequence of a ranging message in a payload section of the ranging message. The apparatus 1404 may further include means for generating the secure sequence based at least in part on the first information. The apparatus 1404 may further include means for transmitting the ranging message including the secure sequence and the payload section for a second wireless device.

In one configuration, the apparatus 1404 may further include means for detecting a spoofing transmission or a spurious transmission, where the secure sequence is generated based at least in part on the first information when the spoofing transmission or the spurious transmission is detected.

In another configuration, the apparatus 1404 may further include means for transmitting a configuration message for the second wireless device that includes the first information and an indication to switch to a ranging message format that includes the payload section.

In another configuration, the first information may correspond to a portion of an input parameter for generating the secure sequence. In such a configuration, the input parameter may include a plaintext or a key associated with an AES encryption.

In another configuration, the first information may identify a portion of an SYNC field of the ranging message.

In another configuration, the first information may identify a portion of an SFD field of the ranging message.

In another configuration, the first wireless device and the second wireless device may include an anchor device, a tag device, or both.

In another configuration, the ranging message may be associated with a first STS packet configuration or an STS packet configuration one.

In another configuration, the ranging message may be associated with an UWB ranging session.

In another configuration, the ranging message may be a DL message or an UL message.

In another configuration, a portion of the secure sequence, a reduced size secure subsequence, or smaller repetitions of the secure sequence is transmitted in the ranging message.

The means may be the UWB ranging component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
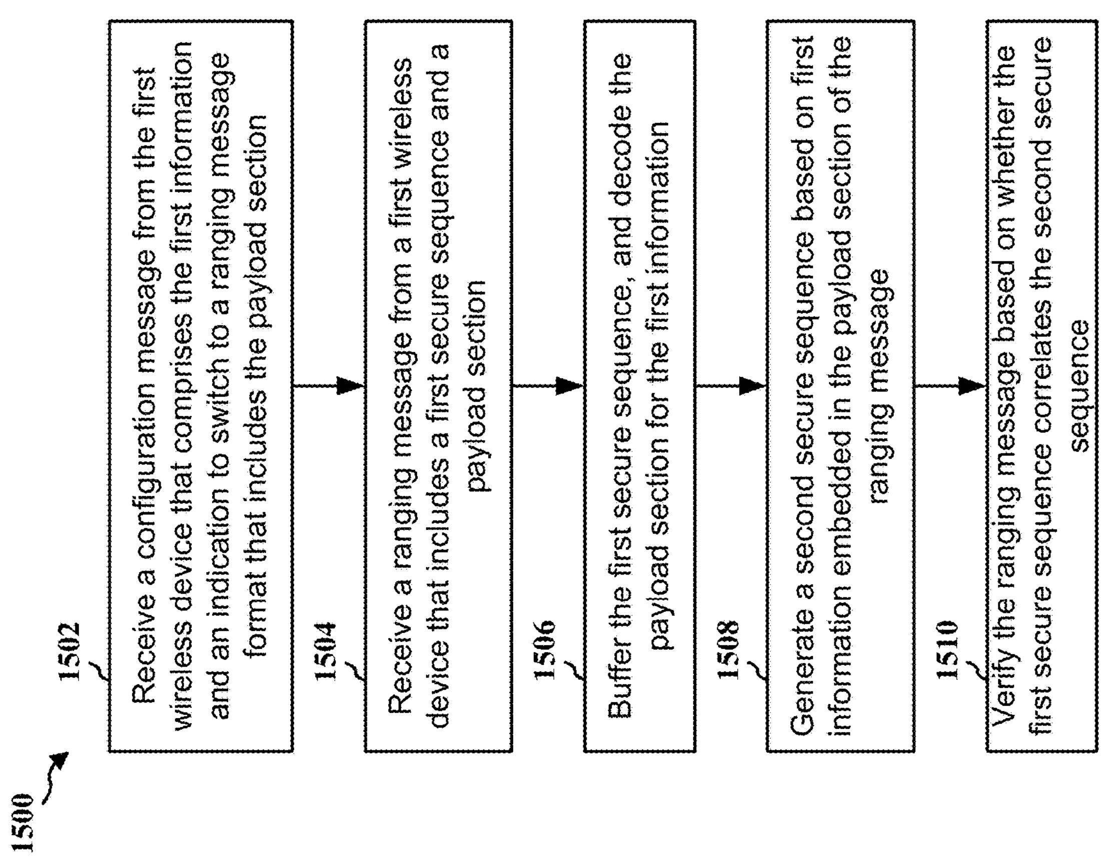
FIG. 15 is a flowchart of a method of wireless communication.

FIG. 15 is a flowchart 1500 of a method of wireless communication. The method may be performed by a second wireless device (e.g., the UE 104; the base station 102; the device A 1002; the anchors 1004; the receiving device 1104; the apparatus 1704; the network entity 1702). The method may enable the second wireless device to verify authenticity of a ranging message based on information embedded in the payload of the ranging message.

At 1502, the second wireless device may receive a configuration message from the first wireless device that includes the first information and an indication to switch to a ranging message format that includes the payload section, such as described in connection with FIG. 11. For example, at 1128, the receiving device 1104 may receive a configuration message 1130 from the transmitting device 1102 that includes the information 1108 and an indication to switch to a ranging message format that includes the payload section 1112. The reception of the configuration message may be performed by, e.g., the UWB ranging component 198 and/or the cellular RF transceiver 1722 of the apparatus 1704 in FIG. 17.

At 1504, the second wireless device may receive a ranging message from a first wireless device that includes a first secure sequence and a payload section, such as described in connection with FIG. 11. For example, at 1124, the receiving device 1104 may receive the ranging message 1106 including the STS 1110 and the payload section 1112 from the transmitting device 1102. The reception of the ranging message may be performed by, e.g., the UWB ranging component 198 and/or the cellular RF transceiver 1722 of the apparatus 1704 in FIG. 17.

In one example, a portion of the first secure sequence, a reduced size secure subsequence, or smaller repetitions of the first secure sequence may be received in the ranging message (whether to receive the portion of the secure sequence, the reduced size secure subsequence, or smaller repetitions of the secure sequence with the secure sequence or in place of the secure sequence may be based on a buffering capability associated with the second wireless device, such as described in connection with FIGS. 18A and 18B).

At 1506, the second wireless device may buffer the first secure sequence prior to generating the second secure sequence and decode the payload section for the first information upon buffering the first secure sequence, such as described in connection with FIG. 11. For example, at 1132, the receiving device 1104 may buffer the STS 1110 and decode the payload section 1112 to obtain the information 1108. The buffering of the first secure sequence and the decode of the payload section may be performed by, e.g., the UWB ranging component 198 of the apparatus 1704 in FIG. 17.

In one example, the first information may correspond to a portion of an input parameter for generating the secure sequence. In such an example, the input parameter may include a plaintext or a key associated with an AES encryption.

In another example, the first information may identify a portion of an SYNC field of the ranging message.

In another example, the first information may identify a portion of an SFD field of the ranging message.

In another example, the first wireless device and the second wireless device includes an anchor device, a tag device, or both.

In another example, the ranging message may be associated with a first STS packet configuration or an STS packet configuration one.

In another example, the ranging message may be associated with an UWB ranging session.

In another example, the ranging message may be a DL message or an UL message.

At 1508, the second wireless device may generate a second secure sequence based on information embedded in the payload section of the ranging message, such as described in connection with FIG. 11. For example, at 1134, the receiving device 1104 may generate the STS 1114 based on the information 1108 embedded in the payload section 1112 of the ranging message 1106. The generation of the second secure sequence may be performed by, e.g., the UWB ranging component 198 of the apparatus 1704 in FIG. 17.

At 1510, the second wireless device may verify the ranging message based on whether the first secure sequence correlates the second secure sequence, such as described in connection with FIG. 11. For example, at 1136, the receiving device 1104 may verify the ranging message 1106 based on whether the STS 1110 correlates the STS 1114. The verification of the ranging message may be performed by, e.g., the UWB ranging component 198 of the apparatus 1704 in FIG. 17.

Figure 16:
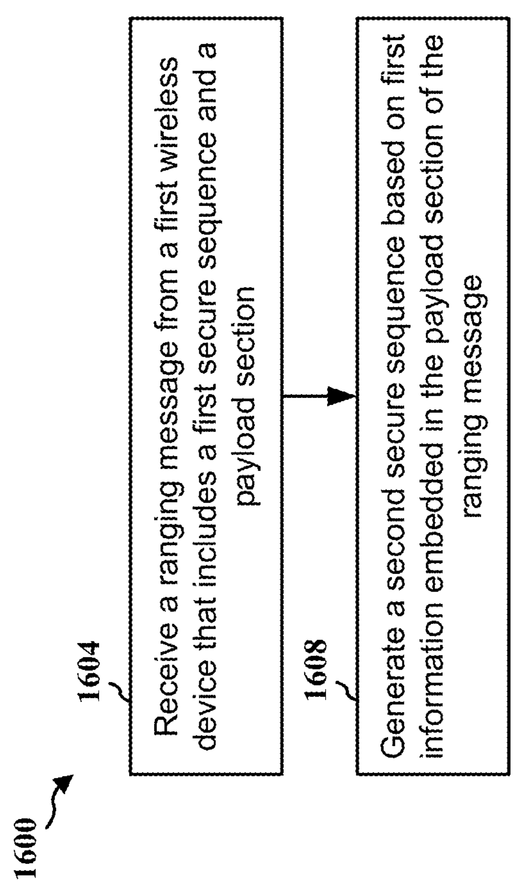
FIG. 16 is a flowchart of a method of wireless communication.

FIG. 16 is a flowchart 1600 of a method of wireless communication. The method may be performed by a second wireless device (e.g., the UE 104; the base station 102; the device A 1002; the anchors 1004; the receiving device 1104; the apparatus 1704; the network entity 1702). The method may enable the second wireless device to verify authenticity of a ranging message based on information embedded in the payload of the ranging message.

At 1604, the second wireless device may receive a ranging message from a first wireless device that includes a first secure sequence and a payload section, such as described in connection with FIG. 11. For example, at 1124, the receiving device 1104 may receive the ranging message 1106 including the STS 1110 and the payload section 1112 from the transmitting device 1102. The reception of the ranging message may be performed by, e.g., the UWB ranging component 198 and/or the cellular RF transceiver 1722 of the apparatus 1704 in FIG. 17.

In one example, a portion of the first secure sequence, a reduced size secure subsequence, or smaller repetitions of the first secure sequence may be received in the ranging message (whether to receive the portion of the secure sequence, the reduced size secure subsequence, or smaller repetitions of the secure sequence with the secure sequence or in place of the secure sequence may be based on a buffering capability associated with the second wireless device, such as described in connection with FIGS. 18A and 18B).

In one example, the second wireless device may buffer the first secure sequence prior to generating the second secure sequence and decode the payload section for the first information upon buffering the first secure sequence, such as described in connection with FIG. 11. For example, at 1132, the receiving device 1104 may buffer the STS 1110 and decode the payload section 1112 to obtain the information 1108. The buffering of the first secure sequence and decoding of the payload section may be performed by, e.g., the UWB ranging component 198 of the apparatus 1704 in FIG. 17.

In another example, the first information may correspond to a portion of an input parameter for generating the secure sequence. In such an example, the input parameter may include a plaintext or a key associated with an AES encryption.

In another example, the first information may identify a portion of an SYNC field of the ranging message.

In another example, the first information may identify a portion of an SFD field of the ranging message.

In another example, the first wireless device and the second wireless device includes an anchor device, a tag device, or both.

In another example, the ranging message may be associated with a first STS packet configuration or an STS packet configuration one.

In another example, the ranging message may be associated with an UWB ranging session.

In another example, the ranging message may be a DL message or an UL message.

At 1608, the second wireless device may generate a second secure sequence based on information embedded in the payload section of the ranging message, such as described in connection with FIG. 11. For example, at 1134, the receiving device 1104 may generate the STS 1114 based on the information 1108 embedded in the payload section 1112 of the ranging message 1106. The generation of the second secure sequence may be performed by, e.g., the UWB ranging component 198 of the apparatus 1704 in FIG. 17.

In one example, the second wireless device may verify the ranging message based on whether the first secure sequence correlates the second secure sequence, such as described in connection with FIG. 11. For example, at 1136, the receiving device 1104 may verify the ranging message 1106 based on whether the STS 1110 correlates the STS 1114. The verification of the ranging message may be performed by, e.g., the UWB ranging component 198 of the apparatus 1704 in FIG. 17.

In another example, the second wireless device may receive a configuration message from the first wireless device that includes the first information and an indication to switch to a ranging message format that includes the payload section, such as described in connection with FIG. 11. For example, at 1128, the receiving device 1104 may receive a configuration message 1130 from the transmitting device 1102 that includes the information 1108 and an indication to switch to a ranging message format that includes the payload section 1112. The reception of the configuration message may be performed by, e.g., the UWB ranging component 198 and/or the cellular RF transceiver 1722 of the apparatus 1704 in FIG. 17.

Figure 17:
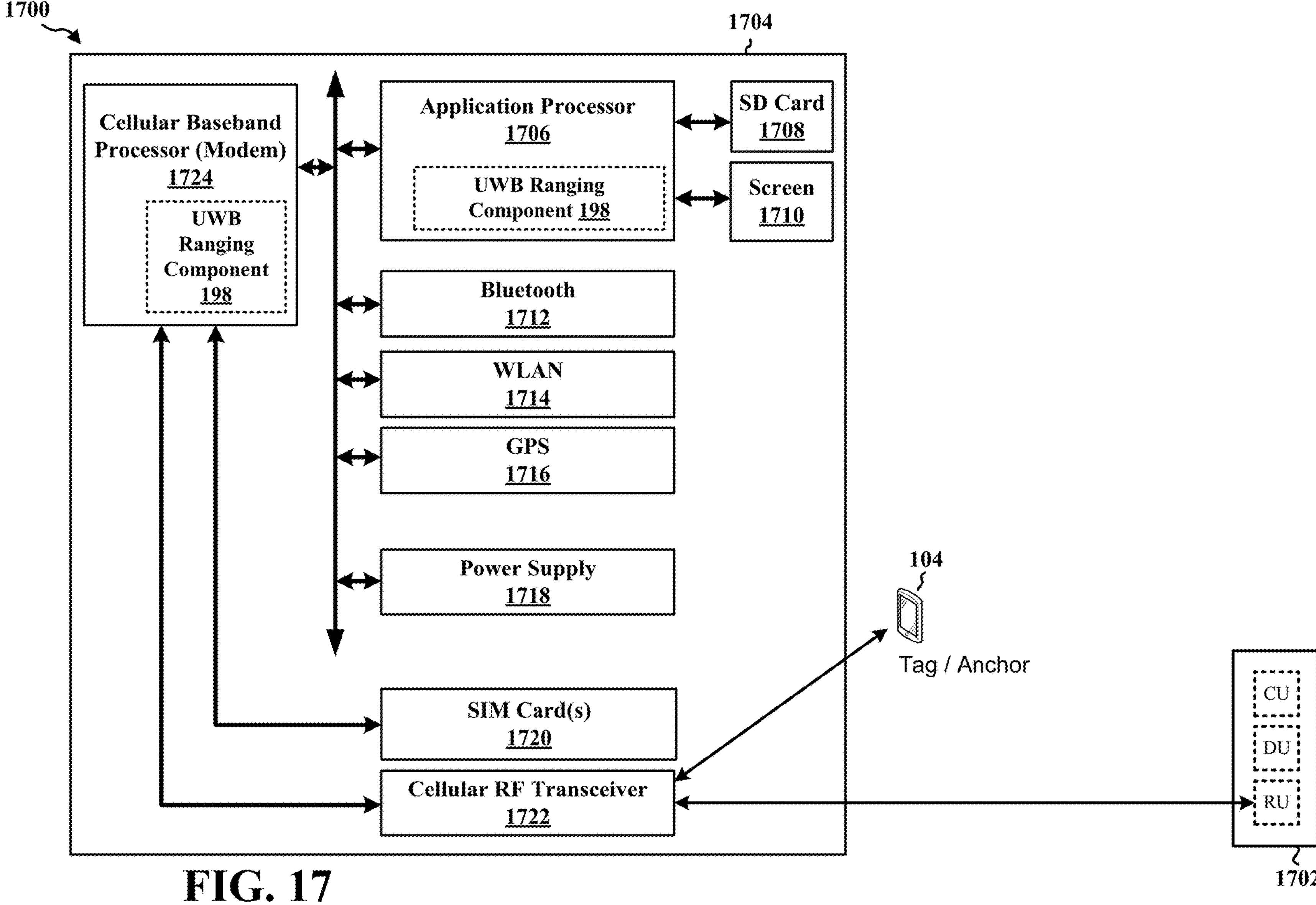
FIG. 17 is a diagram illustrating an example of a hardware implementation for an example apparatus and/or network entity.

FIG. 17 is a diagram 1700 illustrating an example of a hardware implementation for an apparatus 1704 and a network entity 1702. The apparatus 1704 may be receiving device (e.g., a UE/BS, a component of a UE/BS, or may implement UE/BS functionality). The network entity 1702 may be a BS, a component of a BS, or may implement BS functionality. In some aspects, the apparatus 1704 may include a cellular baseband processor 1724 (also referred to as a modem) coupled to a cellular RF transceiver 1722. In some aspects, the apparatus 1704 may further include one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, or a power supply 1718. The cellular baseband processor 1724 communicates through the cellular RF transceiver 1722 with the UE 104 (e.g., a tag, an anchor, etc.) and/or with an RU associated with the network entity 1702. The RU is either part of the network entity 1702 or is in communication with the network entity 1702. The network entity 1702 may include one or more of the CU, DU, and the RU. The cellular baseband processor 1724 and the application processor 1706 may each include a computer-readable medium/memory. Each computer-readable medium/memory may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed supra, the UWB ranging component 198 is configured to receive a ranging message from a first wireless device that includes a first secure sequence and a payload section. The UWB ranging component 198 may also be configured to generate a second secure sequence based on information embedded in the payload section of the ranging message. The UWB ranging component 198 may also be configured to verify the ranging message based on whether the first secure sequence correlates the second secure sequence. The UWB ranging component 198 may be within the cellular baseband processor 1724, the application processor 1706, or both the cellular baseband processor 1724 and the application processor 1706. The UWB ranging component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for receiving a ranging message from a first wireless device that includes a first secure sequence and a payload section. The apparatus 1704 may further include means for generating a second secure sequence based on information embedded in the payload section of the ranging message. The apparatus 1704 may further include means for verifying the ranging message based on whether the first secure sequence correlates the second secure sequence.

In one configuration, the apparatus 1704 may further include means for buffering the first secure sequence prior to generating the second secure sequence.

In another configuration, the apparatus 1704 may further include means for decoding the payload section for the first information upon buffering the first secure sequence.

In another configuration, the apparatus 1704 may further include means for receiving a configuration message from the first wireless device that includes the first information and an indication to switch to a ranging message format that includes the payload section.

In another configuration, a portion of the first secure sequence, a reduced size secure subsequence, or smaller repetitions of the first secure sequence is received in the ranging message.

In another configuration, the first information may correspond to a portion of an input parameter for generating the secure sequence. In such a configuration, the input parameter may include a plaintext or a key associated with an AES encryption.

In another configuration, the first information may identify a portion of an SYNC field of the ranging message.

In another configuration, the first information may identify a portion of an SFD field of the ranging message.

In another configuration, the first wireless device and the second wireless device includes an anchor device, a tag device, or both.

In another configuration, the ranging message may be associated with a first STS packet configuration or an STS packet configuration one.

In another configuration, the ranging message may be associated with an UWB ranging session.

In another configuration, the ranging message may be a DL message or an UL message.

The means may be the UWB ranging component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used in this disclosure outside of the claims, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative. As used in the claims, the phrase "based on A" shall be interpreted as "based at least on A" unless specifically recited differently.

The following aspects are illustrative only and may be combined with other aspects or teachings described herein, without limitation.

Aspect 1 is an apparatus for wireless communication including at least one sensor, and at least one processor coupled to a memory and configured to: embed first information for generating a secure sequence of a ranging message in a payload section of the ranging message; generate the secure sequence based at least in part on the first information; and transmit the ranging message including the secure sequence and the payload section for a second wireless device.

Aspect 2 is the apparatus of aspect 1, where the first information corresponds to a portion of an input parameter for generating the secure sequence.

Aspect 3 is the apparatus of any of aspects 1 and 2, where the input parameter includes a plaintext or a key associated with an AES encryption.

Aspect 4 is the apparatus of any of aspects 1 to 3, where the first information identifies a portion of an SYNC field of the ranging message.

Aspect 5 is the apparatus of any of aspects 1 to 4, where the first information identifies a portion of an SFD field of the ranging message.

Aspect 6 is the apparatus of any of aspects 1 to 5, where the first wireless device and the second wireless device includes an anchor device, a tag device, or both.

Aspect 7 is the apparatus of any of aspects 1 to 6, where the ranging message is associated with a first STS packet configuration or an STS packet configuration one.

Aspect 8 is the apparatus of any of aspects 1 to 7, where the at least one processor is further configured to: detect for a spoofing transmission or a spurious transmission, where the secure sequence is generated based at least in part on the first information when the spoofing transmission or the spurious transmission is detected.

Aspect 9 is the apparatus of any of aspects 1 to 8, where the at least one processor is further configured to: transmit a configuration message for the second wireless device that includes the first information and an indication to switch to a ranging message format that includes the payload section.

Aspect 10 is the apparatus of any of aspects 1 to 9, where the ranging message is associated with a UWB ranging session.

Aspect 11 is the apparatus of any of aspects 1 to 10, where the ranging message is a DL message or an UL message.

Aspect 12 is the apparatus of any of aspects 1 to 11 further including at least one of a transceiver or an antenna coupled to the at least one processor.

Aspect 13 is the apparatus of any of aspects 1 to 12, where a portion of the secure sequence, a reduced size secure subsequence, or smaller repetitions of the secure sequence is transmitted in the ranging message.

Aspect 14 is a method of wireless communication for implementing any of aspects 1 to 13.

Aspect 15 is an apparatus for wireless communication including means for implementing any of aspects 1 to 13.

Aspect 16 is a computer-readable medium storing computer executable code, where the code when executed by a processor causes the processor to implement any of aspects 1 to 13.

Aspect 17 is an apparatus for wireless communication including at least one sensor, and at least one processor coupled to a memory and configured to: receive a ranging message from a first wireless device that includes a first secure sequence and a payload section; and generate a second secure sequence based on information embedded in the payload section of the ranging message.

Aspect 18 is the apparatus of aspect 17, where the at least one processor is further configured to: buffer the first secure sequence prior to generating the second secure sequence and decode the payload section for the first information upon buffering the first secure sequence.

Aspect 19 is the apparatus of any of aspects 17 and 18, where the first information corresponds to a portion of an input parameter for generating the second secure sequence.

Aspect 20 is the apparatus of any of aspects 17 to 19, where the input parameter includes a plaintext or a key associated with an AES encryption.

Aspect 21 is the apparatus of any of aspects 17 to 20, where the first information identifies a portion of a SYNC field of the ranging message.

Aspect 22 is the apparatus of any of aspects 17 to 21, where the first information identifies a portion of an SFD field of the ranging message.

Aspect 23 is the apparatus of any of aspects 17 to 22, where the first wireless device and the second wireless device includes an anchor device, a tag device, or both.

Aspect 24 is the apparatus of any of aspects 17 to 23, where the ranging message is associated with a first STS packet configuration or an STS packet configuration one.

Aspect 25 is the apparatus of any of aspects 17 to 24, where the at least one processor is further configured to: receive a configuration message from the first wireless device that includes the first information and an indication to switch to a ranging message format that includes the payload section.

Aspect 26 is the apparatus of any of aspects 17 to 25, where the ranging message is associated with a UWB ranging session.

Aspect 27 is the apparatus of any of aspects 17 to 26, where the ranging message is a DL message or an UL message.

Aspect 28 is the apparatus of any of aspects 17 to 27 further including at least one of a transceiver or an antenna coupled to the at least one processor.

Aspect 29 is the apparatus of any of aspects 17 to 28, where the at least one processor is further configured to: verify the ranging message based on whether the first secure sequence correlates the second secure sequence.

Aspect 30 is the apparatus of any of aspects 17 to 29, where a portion of the first secure sequence, a reduced size secure subsequence, or smaller repetitions of the first secure sequence is received in the ranging message.

Aspect 31 is a method of wireless communication for implementing any of aspects 17 to 30.

Aspect 32 is an apparatus for wireless communication including means for implementing any of aspects 17 to 30.

Aspect 33 is a computer-readable medium storing computer executable code, where the code when executed by a processor causes the processor to implement any of aspects 17 to 30.

What is claimed is:

1. An apparatus for wireless communication at a first wireless device, comprising:

at least one memory; and at least one processor coupled to the at least one memory and, based at least in part on information stored in the at least one memory, the at least one processor is configured to:

detect a spoofing transmission or a spurious transmission;

embed first information for generating a secure sequence of a ranging message in a payload section of the ranging message;

generate, based on detection of the spoofing transmission or the spurious transmission, the secure sequence based at least in part on the first information; and transmit the ranging message including the secure sequence and the payload section for a second wireless device.

2. The apparatus of claim 1, wherein the first information corresponds to a portion of an input parameter for generating the secure sequence.

3. The apparatus of claim 2, wherein the input parameter includes a plaintext or a key associated with an Advanced Encryption Standard (AES) encryption.

4. The apparatus of claim 1, wherein the first information identifies a portion of a synchronization (SYNC) field of the ranging message.

5. The apparatus of claim 1, wherein the first information identifies a portion of a start of frame delimiter (SFD) field of the ranging message.

6. The apparatus of claim 1, wherein the first wireless device and the second wireless device includes an anchor device, a tag device, or both.

7. The apparatus of claim 1, wherein the ranging message is associated with a first scrambled timestamp sequence (STS) packet configuration or an STS packet configuration one.

8. The apparatus of claim 1, wherein the at least one processor is further configured to:

transmit a configuration message for the second wireless device that comprises the first information and an indication to switch to a ranging message format that includes the payload section.

9. The apparatus of claim 1, wherein the ranging message is associated with an ultra-wideband (UWB) ranging session.

10. The apparatus of claim 1, wherein the ranging message is a downlink message or an uplink message.

11. The apparatus of claim 1, wherein a portion of the secure sequence, a reduced size secure subsequence, or smaller repetitions of the secure sequence is transmitted in the ranging message, further comprising at least one of a transceiver or an antenna coupled to the at least one processor.

12. A method of wireless communication at a first wireless device, comprising:

detecting a spoofing transmission or a spurious transmission;

embedding first information for generating a secure sequence of a ranging message in a payload section of the ranging message;

generating, based on detection of the spoofing transmission or the spurious transmission, the secure sequence based at least in part on the first information; and transmitting the ranging message including the secure sequence and the payload section for a second wireless device.

13. An apparatus for wireless communication at a second wireless device, comprising:

at least one memory; and at least one processor coupled to the at least one memory and, based at least in part on information stored in the at least one memory, the at least one processor is configured to:

receive, from a first wireless device, a configuration message that comprises first information and an indication to switch to a ranging message format that includes a payload section;

receive, from the first wireless device based on the configuration message, a ranging message that includes a first secure sequence and the payload section;

generate a second secure sequence based on the first information embedded in the payload section of the ranging message; and verify the ranging message based on whether the first secure sequence correlates the second secure sequence.

14. The apparatus of claim 13, wherein the at least one processor is further configured to:

buffer the first secure sequence prior to generating the second secure sequence; and decode the payload section for the first information upon buffering the first secure sequence.

15. The apparatus of claim 13, wherein the first information corresponds to a portion of an input parameter for generating the second secure sequence.

16. The apparatus of claim 15, wherein the input parameter includes a plaintext or a key associated with an Advanced Encryption Standard (AES) encryption.

17. The apparatus of claim 13, wherein the first information identifies a portion of a synchronization (SYNC) field of the ranging message.

18. The apparatus of claim 13, wherein the first information identifies a portion of a start of frame delimiter (SFD) field of the ranging message.

19. The apparatus of claim 13, wherein the first wireless device and the second wireless device includes an anchor device, a tag device, or both.

20. The apparatus of claim 13, wherein the ranging message is associated with a first scrambled timestamp sequence (STS) packet configuration or an STS packet configuration one.

21. The apparatus of claim 13, wherein the ranging message is associated with an ultra-wideband (UWB) ranging session.

22. The apparatus of claim 13, wherein the ranging message is a downlink message or an uplink message.

23. The apparatus of claim 13, wherein a portion of the first secure sequence, a reduced size secure subsequence, or smaller repetitions of the first secure sequence is received in the ranging message, further comprising at least one of a transceiver or an antenna coupled to the at least one processor.

24. A method of wireless communication at a second wireless device, comprising:

receiving, from a first wireless device, a configuration message that comprises first information and an indication to switch to a ranging message format that includes a payload section;

receiving, from the first wireless device based on the configuration message, a ranging message that includes a first secure sequence and the payload section;

generating a second secure sequence based on the first information embedded in the payload section of the ranging message; and verifying the ranging message based on whether the first secure sequence correlates the second secure sequence.

25. The method of claim 24, further comprising:

buffering the first secure sequence prior to generating the second secure sequence; and decoding the payload section for the first information upon buffering the first secure sequence.

* * * * *